United States Patent
de Jong et al.

(10) Patent No.: US 9,645,329 B2
(45) Date of Patent: May 9, 2017

(54) GRADIENT INDEX (GRIN) LENS HOLDERS EMPLOYING GROOVE ALIGNMENT FEATURE(S) IN RECESSED COVER AND SINGLE PIECE COMPONENTS, CONNECTORS, AND METHODS

(71) Applicant: CORNING OPTICAL COMMUNICATIONS LLC, Hickory, NC (US)

(72) Inventors: Michael de Jong, Colleyville, TX (US); Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 331 days.

(21) Appl. No.: 14/294,243

(22) Filed: Jun. 3, 2014

(65) Prior Publication Data
US 2016/0202422 A1    Jul. 14, 2016

Related U.S. Application Data

(63) Continuation of application No. PCT/US2012/068144, filed on Dec. 6, 2012.
(Continued)

(51) Int. Cl.
*G02B 6/32* (2006.01)
*G02B 6/42* (2006.01)
(Continued)

(52) U.S. Cl.
CPC ......... *G02B 6/4214* (2013.01); *G02B 3/0087* (2013.01); *G02B 6/32* (2013.01);
(Continued)

(58) Field of Classification Search
CPC .. G02B 6/3608; G02B 6/3616; G02B 6/4204; G02B 6/421; G02B 6/3853
See application file for complete search history.

(56) References Cited

U.S. PATENT DOCUMENTS

| 4,781,431 A | 11/1988 | Wesson et al. |
| 5,163,107 A | 11/1992 | Garriss |

(Continued)

FOREIGN PATENT DOCUMENTS

| AU | 199898138 B2 | 8/1999 | ............... G02B 6/32 |
| CA | 1193477 A * | 9/1985 | ......... G02B 6/29362 |

(Continued)

OTHER PUBLICATIONS

Fiber Coupling Using Graded-Index Rod Lenses, Joseph C. Palais, Applied Optics, vol. 19, No. 12, Jun. 15, 1980, 8 pages.
(Continued)

*Primary Examiner* — Rhonda Peace

(57) ABSTRACT

Gradient index (GRIN) lens holders employing groove alignment feature(s) in recessed cover and single piece components, connectors, and methods are disclosed. In one embodiment, the GRIN lens holder contains one or more internal groove alignment features configured to secure one or more GRIN lenses in the GRIN lens holder. The groove alignment features are also configured to accurately align the end faces of the GRIN lenses. The GRIN lens holders disclosed herein can be provided as part of an optical fiber ferrule and/or a fiber optic component or connector for making optical connections. A fiber optic connector containing the GRIN lens holders disclosed herein may be optically connected to one or more optical fibers in another fiber optic connector or to an optical device, such as a laser-emitting diode (LED), laser diode, or opto-electronic device for light transfer.

18 Claims, 24 Drawing Sheets

Related U.S. Application Data

(60) Provisional application No. 61/568,951, filed on Dec. 9, 2011.

(51) Int. Cl.
*G02B 3/00* (2006.01)
*G02B 6/38* (2006.01)

(52) U.S. Cl.
CPC ............ *G02B 6/3853* (2013.01); *G02B 6/421* (2013.01); *G02B 6/4206* (2013.01); *G02B 6/3829* (2013.01); *G02B 6/3839* (2013.01); *G02B 6/3885* (2013.01); *G02B 6/4243* (2013.01); *G02B 6/4249* (2013.01)

(56) References Cited

U.S. PATENT DOCUMENTS

| | | | |
|---|---|---|---|
| 5,168,537 A | 12/1992 | Rajasekharan et al. ........ 385/89 |
| 5,333,225 A | 7/1994 | Jacobowitz et al. ............ 385/93 |
| 5,548,677 A | 8/1996 | Kakii et al. ..................... 385/92 |
| 5,917,976 A | 6/1999 | Yamaguchi |
| 5,918,976 A | 7/1999 | Hashimoto et al. |
| 6,056,448 A | 5/2000 | Sauter et al. |
| 6,272,272 B1 | 8/2001 | Ford .............................. 385/52 |
| 6,530,696 B1 | 3/2003 | Ueda et al. |
| 6,633,700 B2 | 10/2003 | Bellman et al. |
| 6,668,119 B2 | 12/2003 | Matsumoto et al. ........... 385/52 |
| 6,823,109 B2 * | 11/2004 | Sasaki ...................... G02B 6/32 385/31 |
| 7,269,317 B2 | 9/2007 | Blauvelt et al. |
| 7,331,720 B1 | 2/2008 | McColloch |
| 7,543,994 B2 | 6/2009 | McColloch ..................... 385/89 |
| 7,553,091 B2 | 6/2009 | McColloch |
| 7,887,243 B2 | 2/2011 | Abel et al. |
| 8,277,130 B2 | 10/2012 | Nishimura et al. |
| 8,449,205 B2 | 5/2013 | Little et al. |
| RE44,664 E | 12/2013 | McColloch |
| 8,651,749 B2 | 2/2014 | Dainese Junior et al. |
| 8,757,893 B1 | 6/2014 | de Jong et al. |
| 8,774,577 B2 * | 7/2014 | Benjamin ............. G02B 6/3886 385/15 |
| 8,781,273 B2 * | 7/2014 | Benjamin ............. G02B 6/3886 385/15 |
| 9,022,669 B2 * | 5/2015 | de Jong ............... G02B 6/3853 385/76 |
| 9,069,142 B2 | 6/2015 | Fortusini et al. |
| 9,151,900 B2 * | 10/2015 | Benjamin ............. G02B 6/3886 |
| 9,151,912 B2 * | 10/2015 | de Jong ............... G02B 6/4206 |
| 9,201,201 B2 | 12/2015 | Charbonneau-Lefort et al. |
| 9,261,651 B2 * | 2/2016 | Benjamin ............. G02B 6/3886 |
| 9,304,265 B2 | 4/2016 | Isenhour et al. |
| 9,435,917 B2 * | 9/2016 | DeMeritt ............. G02B 3/0087 |
| 2002/0031301 A1 | 3/2002 | Sasaki et al. |
| 2002/0064347 A1 | 5/2002 | Mertz et al. |
| 2002/0168135 A1 | 11/2002 | Dautartas et al. |
| 2002/0172474 A1 | 11/2002 | Kim et al. |
| 2003/0034438 A1 | 2/2003 | Sherrer et al. |
| 2003/0113071 A1 | 6/2003 | Kim et al. |
| 2003/0113077 A1 | 6/2003 | Xu et al. |
| 2003/0128437 A1 | 7/2003 | Sato et al. |
| 2003/0201462 A1 | 10/2003 | Pommer et al. |
| 2003/0210873 A1 | 11/2003 | Moretti et al. |
| 2004/0005124 A1 | 1/2004 | Gallup et al. |
| 2004/0081405 A1 | 4/2004 | Stevens et al. |
| 2004/0109646 A1 | 6/2004 | Anderson et al. |
| 2006/0039655 A1 | 2/2006 | Wilson |
| 2006/0045421 A1 | 3/2006 | Baets et al. |
| 2006/0140544 A1 | 6/2006 | Morimoto et al. |
| 2006/0154884 A1 | 7/2006 | Buchwald |
| 2006/0245694 A1 | 11/2006 | Chen et al. |
| 2007/0147733 A1 | 6/2007 | Matsumura et al. |
| 2008/0095501 A1 | 4/2008 | McColloch ..................... 385/59 |
| 2008/0095506 A1 | 4/2008 | McColloch |
| 2008/0166094 A1 | 7/2008 | Bookbinder et al. |
| 2009/0154884 A1 | 6/2009 | Chen et al. ..................... 385/79 |
| 2009/0169163 A1 | 7/2009 | Abbott, III et al. |
| 2009/0252455 A1 | 10/2009 | Ohta et al. ..................... 385/42 |
| 2010/0028563 A1 | 2/2010 | Ota |
| 2010/0135618 A1 | 6/2010 | Howard et al. |
| 2011/0064357 A1 | 3/2011 | Chang |
| 2011/0091167 A1 * | 4/2011 | Nishimura .......... G02B 6/4214 385/88 |
| 2011/0116746 A1 | 5/2011 | Chen |
| 2011/0150399 A1 | 6/2011 | Sabano et al. ................. 385/83 |
| 2011/0229077 A1 | 9/2011 | Fortusini et al. ............... 385/33 |
| 2011/0255825 A1 | 10/2011 | Ko et al. |
| 2011/0317959 A1 * | 12/2011 | Ohta .................... G02B 6/4214 385/38 |
| 2012/0027346 A1 | 2/2012 | Castagna et al. |
| 2012/0093462 A1 | 4/2012 | Childers et al. |
| 2012/0155803 A1 | 6/2012 | Benjamin et al. |
| 2012/0163754 A1 | 6/2012 | Benjamin et al. |
| 2012/0177327 A1 * | 7/2012 | DeMeritt ............... G02B 6/327 385/74 |
| 2012/0189252 A1 * | 7/2012 | Bhagavatula .......... G02B 6/32 385/79 |
| 2012/0227346 A1 | 9/2012 | Tsambasis |
| 2012/0251045 A1 | 10/2012 | Budd et al. |
| 2012/0321249 A1 * | 12/2012 | DeMeritt ............. G02B 3/0087 385/34 |
| 2012/0328245 A1 | 12/2012 | Lin |
| 2014/0003767 A1 * | 1/2014 | de Jong ............... G02B 6/4206 385/33 |
| 2014/0143996 A1 | 5/2014 | Bhagavatula et al. |
| 2014/0178010 A1 * | 6/2014 | de Jong ............... G02B 6/3853 385/79 |
| 2014/0185991 A1 | 7/2014 | de Jong et al. |
| 2014/0308002 A1 * | 10/2014 | Benjamin ............. G02B 6/3886 385/33 |
| 2014/0308003 A1 * | 10/2014 | Benjamin ............. G02B 6/3886 385/33 |
| 2016/0202422 A1 * | 7/2016 | de Jong .................. G02B 6/32 385/33 |

FOREIGN PATENT DOCUMENTS

| | | | |
|---|---|---|---|
| CA | 2373226 | 8/2002 | |
| CN | 101828137 | 9/2010 | |
| CN | 102122035 | 7/2011 | |
| CN | 102147508 | 8/2011 | |
| DE | 19932907 A1 | 2/2001 | ............ G02B 6/43 |
| EP | 0393829 A2 | 10/1990 | ............ G02B 6/42 |
| EP | 0760488 | 3/1997 | |
| EP | 0860720 | 8/1998 | |
| EP | 1237021 A2 | 9/2002 | ............ G02B 6/32 |
| EP | 1447695 A2 | 8/2004 | ............ G02B 6/42 |
| FR | 2545617 | 11/1984 | |
| GB | 2097550 A | 11/1982 | |
| GB | 2359901 A | 9/2001 | ............ G02B 6/38 |
| JP | 57076509 | 5/1982 | |
| JP | 57-139704 A | 8/1982 | ............ G02B 5/14 |
| JP | 57158824 | 9/1982 | |
| JP | 63174004 | 7/1988 | |
| JP | 63-293510 A | 11/1988 | ............ G02B 6/42 |
| JP | 1988293510 | 11/1988 | |
| JP | 2001004863 | 1/2001 | |
| JP | 2004219478 | 8/2004 | |
| JP | 2007-163969 A | 6/2007 | ............ G02B 6/32 |
| JP | 2011116955 | 6/2011 | |
| JP | 4742729 B2 | 8/2011 | ............ G02B 6/32 |
| WO | 9734176 | 9/1997 | |
| WO | 0070381 | 11/2000 | |
| WO | WO01/11409 A2 | 2/2001 | ............ G02B 23/24 |
| WO | 02056076 | 7/2002 | |
| WO | 02057826 | 7/2002 | |
| WO | WO02/057826 A1 | 7/2002 | ............ G02B 6/36 |
| WO | WO03/076993 A1 | 9/2003 | ............ G02B 6/32 |
| WO | WO2006/108024 A1 | 10/2006 | ............ G02B 6/38 |
| WO | 2013086117 | 6/2013 | |
| WO | 2013086127 | 6/2013 | |

(56) References Cited

FOREIGN PATENT DOCUMENTS

OTHER PUBLICATIONS

Analysis and Evaluation of Graded-Index Fiber-Lenses, William L. Emkey et al., Journal of Lightwave Technology, vol. LT-5, No. 9, Sep. 1987, 9 pages.

Gradient-Index Lenses Specification Sheet, CVI Melles Griot, 4 pages.

Design and Demonstration of a Multicore Single-Mode Fiber Coupled Lens Device, P. Chanclou et al., Science Direct Optics Communications, Jan. 23, 2004, 7 pages.

Misalignment Losses at Multimode Graded-Index Fiber Splices and GRIN Rod Lens Couplers, J. M. Senior et al., Applied Optics, vol. 24, No. 7, Apr. 1, 1985, 7 pages.

Single-Mode Fiber Coupling Efficiency with Graded-Index Rod Lenses, Robert W. Gilsdorf et al., Applied Optics, vol. 33, No. 16, Jun. 1, 1994, 6 pages.

Angular Tilt Misalignment Loss at a GRIN Rod Lens Coupler, Stewart D. Cusworth et al., Applied Optics, vol. 25, No. 11, Jun. 1, 1986, 5 pages.

Applications of GRIN-Rod Lenses in Optical Fiber Communication Systems, W. J. Tomlinson, Applied Optics, vol. 19, No. 7, Apr. 1, 1980, 12 pages.

Patent Cooperation Treaty International Search Report, Application No. PCT/US2012/068144, Jul. 4, 2013, 8 pages.

Patent Cooperation Treaty International Search Report, Application No. PCT/US2012/068159, Jul. 4, 2013, 7 pages.

Apr. 17, 2015 Search Report issued in counterpart Chinese Patent Application No. 2012800642479.

European Patent Office Written Opinion, Application No. 12813599.3-1562, Sep. 11, 2014, 23 pages.

CN2012800647985 Office Action Dated Apr. 23, 2015.

CN2012800434902 Search Report Dated Feb. 16, 2015.

International Search Report and Written Opinion of the International Searching Authority; PCT/US2012/054059 Mailed May 3, 2013; 29 Pages.

International Search Report of the International Searching Authority; PCT/US2012/054054; Mailed Nov. 28, 2012.

International Search Report of the International Searching Authority; PCT/US2012/068144 Mailed Jul. 4, 2013.

Nakagawa et al; "Lens-Coupled Laser Diode Module Integrated on Silicon Platform"; Journal of Lighwave Technology, vol. 14, No. 6, Jun. 1996; pp. 1519-1523.

Zickar et al; "MEMS Compatible Micro-GRIN Lenses for Fiber to Chip Coupling of Light"; Optics Express, vol. 14, No. 10, May 2006; pp. 4237-4249.

\* cited by examiner

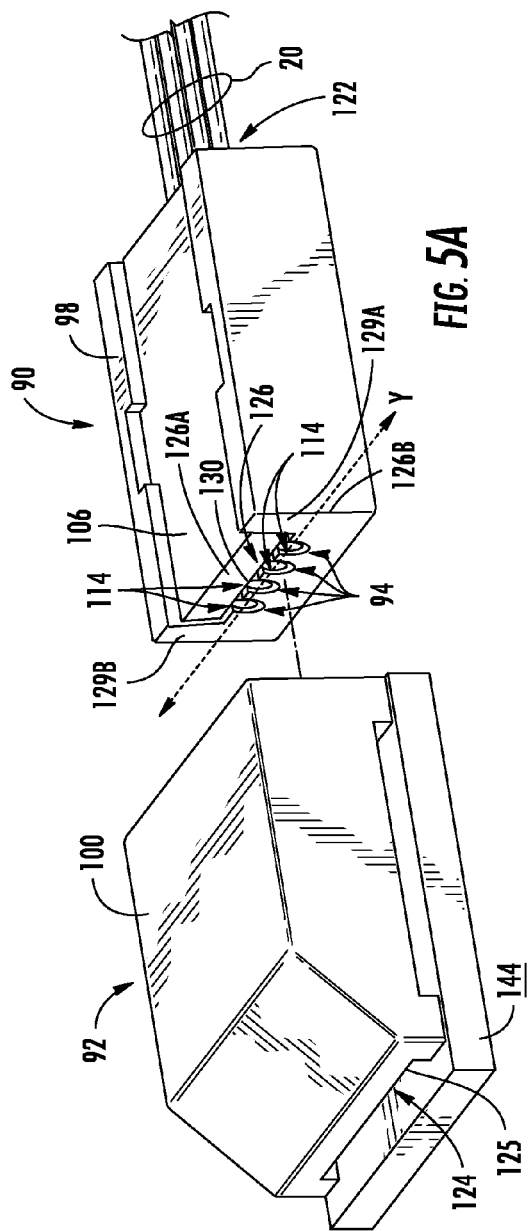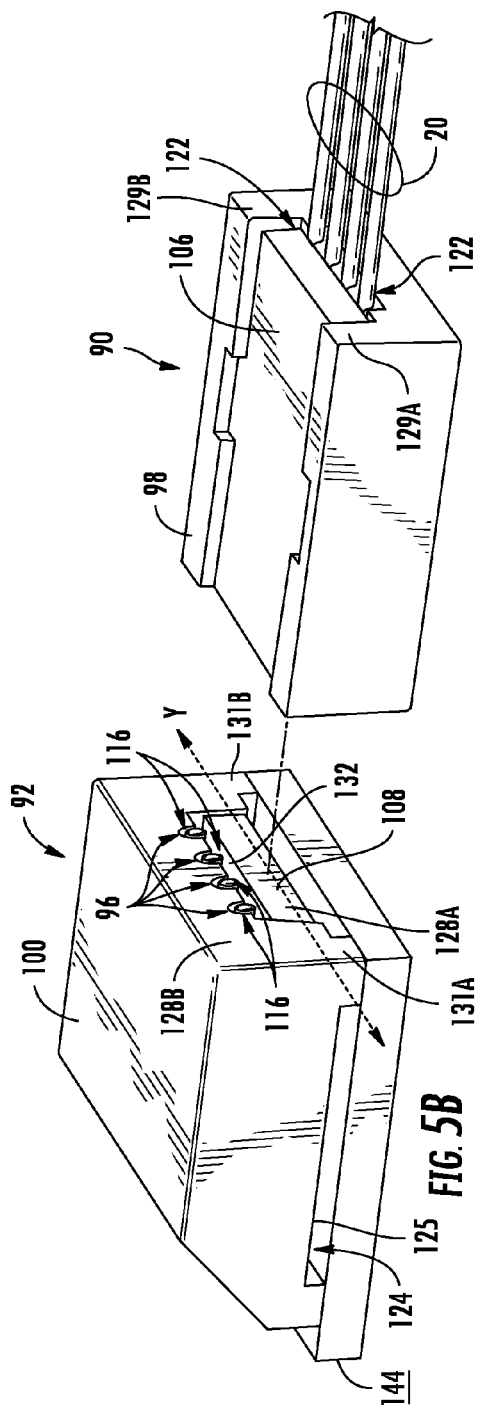

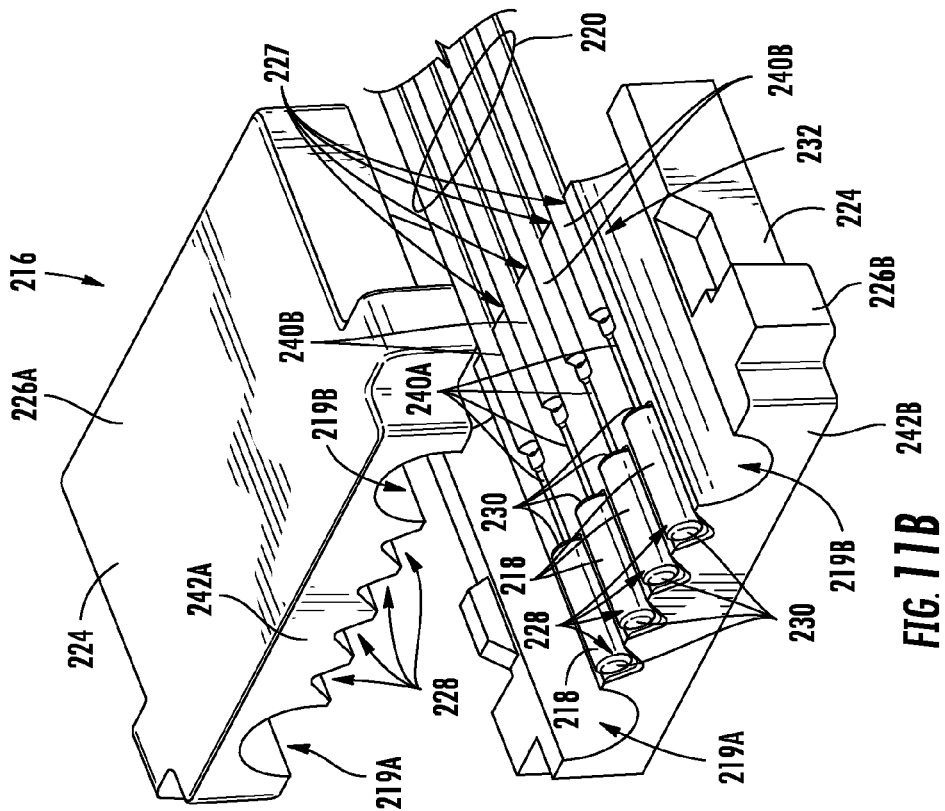
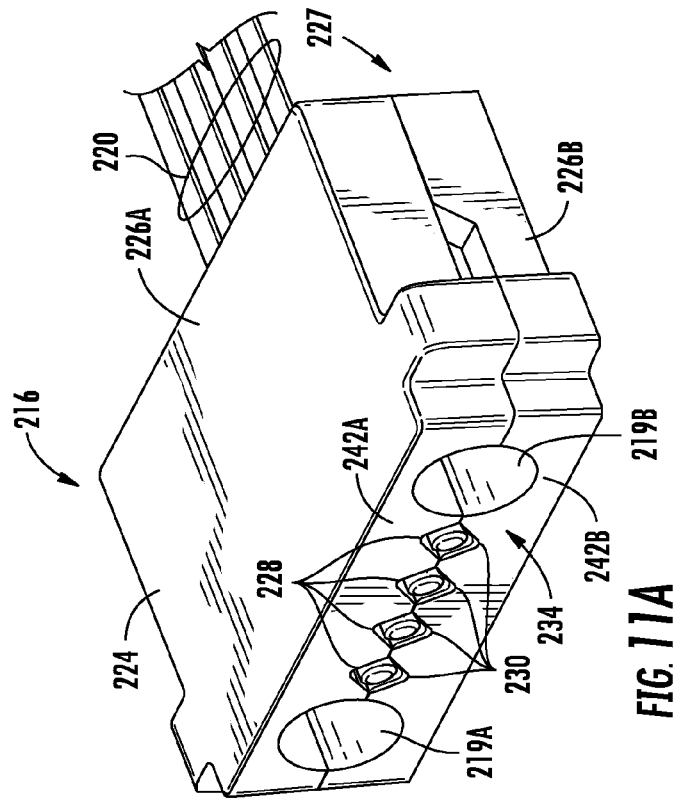
FIG. 11B
FIG. 11A

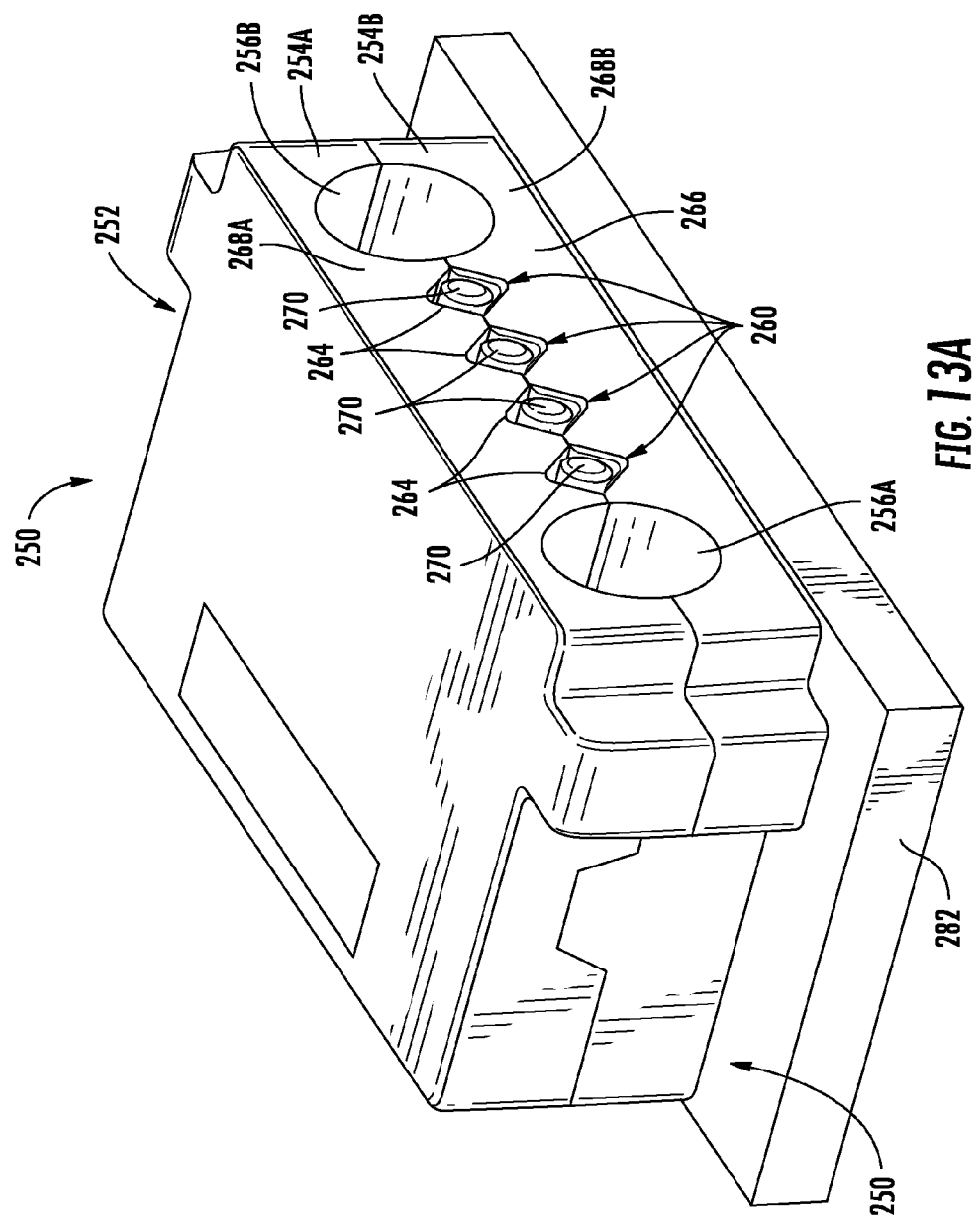

GRADIENT INDEX (GRIN) LENS HOLDERS EMPLOYING GROOVE ALIGNMENT FEATURE(S) IN RECESSED COVER AND SINGLE PIECE COMPONENTS, CONNECTORS, AND METHODS

PRIORITY APPLICATION

This application is a continuation of International Application No. PCT/US12/68144, filed Dec. 6, 2012, which claims the benefit of priority to U.S. Application No. 61/568,951, filed Dec. 9, 2011, both applications being incorporated herein by reference.

BACKGROUND

Field

The technology of the disclosure relates to GRIN lens holders configured to support gradient index (GRIN) lens, wherein the GRIN lens holders may be employed in plugs and receptacles for facilitating optical connections.

Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support optical fiber interconnections.

Fiber optic connectors are provided to facilitate optical connections with optical fibers for the transfer of light. For example, optical fibers can be optically connected to another optical device, such as a light-emitting diode (LED), laser diode, or opto-electronic device for light transfer. As another example, optical fibers can be optically connected to other optical fibers through mated fiber optic connectors. In any of these cases, it is important that the end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

It is common to provide flat end-faced multi-fiber ferrules to more easily facilitate multiple optical fiber connections between the fiber optic connector supporting the ferrule and other fiber optic connectors or other optical devices. In this regard, it is important that fiber optic connectors be designed to allow the end faces of the optical fibers disposed in the ferrule to be placed into contact or closely spaced with an optical device or other optical fiber for light transfer. If an air gap is disposed between the optical fiber and the optical device or other optical fiber, the end of the optical fiber is cleaved (e.g., laser-cleaved) and polished into a curved form to allow it to act as a lens. Spherical aberrations can occur when the end face of the optical fiber is cleaved and polished into a curved form thereby introducing optical losses.

Gradient index (GRIN) lenses offer an alternative to polishing curvatures onto ends of optical fibers to form lenses. GRIN lenses focus light through a precisely controlled radial variation of the lens material's index of refraction from the optical axis to the edge of the lens. The internal structure of this index gradient can dramatically reduce the need for tightly controlled surface curvatures and results in a simple, compact lens. This allows a GRIN lens with flat surfaces to collimate light emitted from an optical fiber or to focus an incident beam into an optical fiber. The GRIN lens can be provided in the form of a glass rod that is disposed in a lens holder as part of a fiber optic connector. The flat surfaces of a GRIN lens allow easy bonding or fusing of one end to an optical fiber disposed inside the fiber optic connector with the other end of the GRIN lens disposed on the ferrule end face. The flat surface on the end face of a GRIN lens can reduce aberrations, because the end faces can be polished to be planar or substantially planar to the end face of the ferrule. The flat surface of the GRIN lens allows for easy cleaning of end faces of the GRIN lens. It is important that the GRIN lens holder be designed with internal holders that place and secure the GRIN lenses in alignment with the desired angular accuracy to avoid or reduce coupling loss.

SUMMARY

Embodiments disclosed herein include gradient index (GRIN) lens holders employing groove alignment feature(s) in recessed cover and single piece components, connectors, and methods. Non-limiting examples of connectors include plugs and receptacles. In one embodiment, the GRIN lens holder contains one or more internal groove alignment features configured to secure the one or more GRIN lenses in the GRIN lens holder. The groove alignment features are also configured to accurately align the end faces of the GRIN lenses. The GRIN lens holders disclosed herein can be provided as part of an optical fiber ferrule and/or a fiber optic component or connector for making optical connections. A fiber optic connector containing the GRIN lens holders disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer. As a non-limiting example, the GRIN lens holders disclosed herein can be provided as part of a plug or receptacle containing one or more optical fibers for establishing optical connections.

In this regard, in one embodiment, a gradient index (GRIN) lens holder is provided. The GRIN lens holder comprises a lens holder body comprising an internal chamber, a recessed floor disposed in the internal chamber, a first raised side disposed on a first side of the recessed floor, and a second raised side disposed on a second side of the recessed floor. A mating face is disposed in the lens holder body. At least one lens opening is disposed in the mating face and coupled in free space to the internal chamber, the at least one lens opening configured to receive at least one end portion of at least one GRIN lens. At least one groove alignment feature is disposed in the recessed floor of the internal chamber of the lens holder body and optically aligned with the at least one lens opening. The at least one groove alignment feature is configured to support at least one GRIN lens disposed in the internal chamber and align at least one end portion of the at least one GRIN lens with the at least one lens opening.

In another embodiment, a method of providing a gradient index (GRIN) lens for a fiber optic connector is provided. The method comprises providing a lens holder body comprising an internal chamber, a recessed floor disposed in the internal chamber, a first raised side disposed on a first side of the recessed floor, and a second raised side disposed on a second side of the recessed floor. The method also comprises disposing at least one GRIN lens in at least one groove alignment feature disposed in the internal chamber of the lens holder body, the at least one groove alignment feature optically aligned with at least one lens opening disposed in a mating face of the lens holder body to optically align the at least one GRIN lens with the at least one lens opening, the at least one lens opening coupled in free space to the internal chamber. The method also comprises disposing a first end portion of the at least one GRIN lens through the at least one lens opening and planar to the mating face of the lens holder body.

In another embodiment, a gradient index (GRIN) lens holder is provided. The GRIN lens holder comprises a single piece component lens holder body comprising an internal chamber. A mating face is disposed in the single piece component lens holder body. At least one lens opening is disposed in the mating face and coupled in free space to the internal chamber, the at least one lens opening configured to receive at least one end portion of at least one GRIN lens. At least one groove alignment feature is disposed in the internal chamber of the single piece component lens holder body and optically aligned with the at least one lens opening. The at least one groove alignment feature is configured to support at least one GRIN lens disposed in the internal chamber and align at least one end portion of the at least one GRIN lens with the at least one lens opening.

In another embodiment, a method of providing a gradient index (GRIN) lens for a fiber optic connector is provided. The method comprises providing a single piece component lens holder body comprising an internal chamber. The method also comprises disposing at least one GRIN lens in at least one groove alignment feature disposed in the internal chamber of the single piece component lens holder body, the at least one groove alignment feature optically aligned with at least one lens opening disposed in a mating face of the single piece component lens holder body to optically align the at least one GRIN lens with the at least one lens opening, the at least one lens opening coupled in free space to the internal chamber. The method also comprises disposing a first end portion of the at least one GRIN lens through the at least one lens opening and planar to the mating face of the single piece component lens holder body.

As non-limiting examples, the GRIN lens holder with the internal groove features may be manufactured from a molding process. As another non-limiting example, the GRIN lens holder may be provided as a one piece component body or multiple piece component bodies. As another non-limiting example, the GRIN lens holder may be disposed in a connector, such as a plug or receptacle.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 5A is a left perspective view of another exemplary plug GRIN lens holder employing a recessed cover lens holder body, mated with a receptacle GRIN lens holder employing a recessed cover lens holder body, to optically connect GRIN lenses disposed in the plug with the GRIN lenses disposed in the receptacle;

FIG. 5B is a right perspective view of FIG. 5A;

FIG. 11A is a close-up perspective, assembled view of the split component lens holder of the GRIN lens holder in FIG. 10;

FIG. 11B is a close-up perspective exploded view of the split component cover lens holder of the GRIN lens holder in FIG. 10;

FIG. 13A is a close-up front perspective assembled view of an exemplary split component GRIN lens holder that may be employed as a receptacle employing internal groove alignment features for securing and aligning GRIN lenses;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include gradient index (GRIN) lens holders employing groove alignment feature(s) in recessed cover and single piece components, connectors, and methods. Non-limiting examples of connectors include plugs and receptacles. In one embodiment, the GRIN lens holder contains one or more internal groove alignment features configured to secure the one or more GRIN lenses in the GRIN lens holder. The groove alignment features are also configured to accurately align the end faces of the GRIN lenses. The GRIN lens holders disclosed herein can be provided as part of an optical fiber ferrule and/or a fiber optic component or connector for making optical connections. A fiber optic connector containing the GRIN lens holders disclosed herein may be optically connected to one or more optical fibers in another fiber optic connector or to an optical device, such as a laser-emitting diode (LED), laser diode, vertical-cavity surface-emitting laser (VCSEL), or optoelectronic device for light transfer. As a non-limiting example, the GRIN lens holders disclosed herein can be provided as part of a plug or receptacle containing one or more optical fibers for establishing optical connections.

Figure 1:
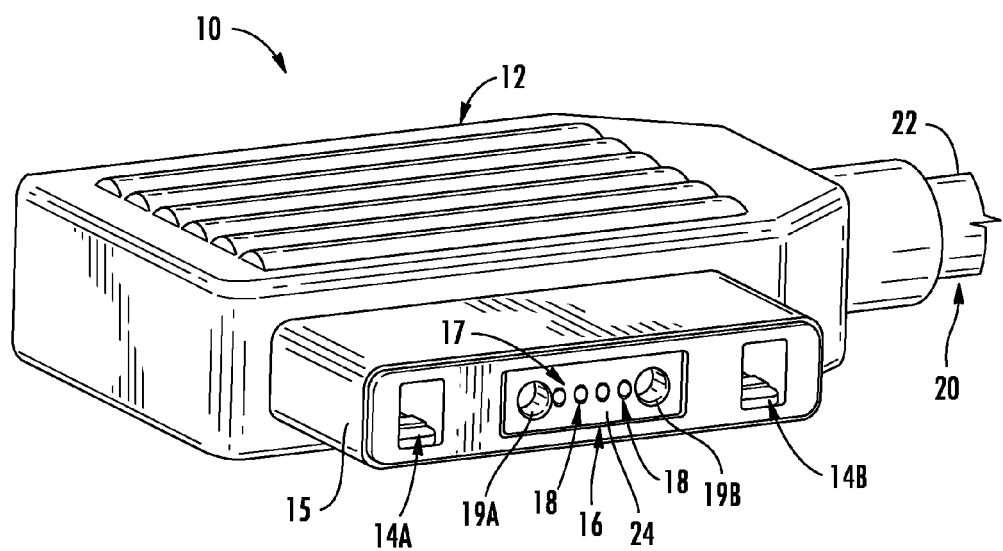
FIG. 1 is a perspective view of an exemplary cable plug employing a gradient index (GRIN) lens holder comprised of a seamless lens holder body employing internal groove alignment features for securing and aligning GRIN lenses.

In this regard, FIG. 1 is a perspective view of an exemplary connector 10 employing a GRIN lens holder configured to support and align GRIN lenses. The connector 10 in this embodiment is provided in the form of a plug 12. For example, the plug 12 may be a fiber optic connection plug that exclusively supports optical components for establishing optical connections. Alternatively, the plug 12 may also include electrical components, such as power conductors 14A, 14B disposed in the plug 12 for establishing electrical connections, as a non-limiting example.

With continuing reference to FIG. 1, the plug 12 in this embodiment employs a gradient index (GRIN) lens holder 16 to support optical components for establishing optical connections. The GRIN lens holder 16 is disposed in a connector housing 15 of the plug 12. The GRIN lens holder 16 could be disposed in a ferrule 17 that is disposed in the connector housing 15, as an example. As discussed in more detail below, the GRIN lens holder 16 is configured to support and align one or more GRIN lenses 18 disposed in the GRIN lens holder 16. For example, the GRIN lens holder 16 disposed in the plug 12 in FIG. 1 is configured to support up to four (4) GRIN lenses 18. The GRIN lenses 18 are optically coupled or fused to optical fibers 20 disposed in a cable 22 secured to the plug 12. In this manner, an optical connection made to the GRIN lenses 18 disposed in the GRIN lens holder 16 through a mating of the plug 12 to a receptacle or other optical component establishes an optical connection to the optical fibers 20. Alignment openings 19A, 19B are disposed in the plug 12 to assist in alignment of the plug 12 to a receptacle when the plug 12 is mated to a receptacle.

The GRIN lenses 18 disposed in the GRIN lens holder 16 of the plug 12 offer an alternative to polishing curvatures onto ends of optical fibers 20 to form lenses. The GRIN lenses 18 focus light through a precisely controlled radial variation of the lens material's index of refraction from the optical axis to the edge of the lens. The internal structure of this index gradient can dramatically reduce the need for tightly controlled surface curvatures and results in a simple, compact lens. This allows the GRIN lenses 18 with flat surfaces to collimate light emitted from the optical fibers 20 or to focus an incident beam into the optical fibers 20. In this embodiment, as will be described in more detail below, the GRIN lenses 18 are provided in the form of glass rods that are disposed in the GRIN lens holder 16. The flat end face surfaces of the GRIN lenses 18 allow easy bonding or fusing of ends of the GRIN lenses 18 to end portions of the optical fibers 20 inside the plug 12, with the other end of the GRIN lenses 18 disposed on a mating face 24 of the GRIN lens holder 16, as illustrated in FIG. 1. The flat end face surfaces of the GRIN lenses 18 can also reduce aberrations.

Further, with continuing reference to FIG. 1, the end faces of the GRIN lenses 18 can be polished to be planar or substantially planar (e.g., within 25-50 µm) to the mating face 24. The flat surface of the GRIN lenses 18 allows for easy cleaning of end faces of the GRIN lenses 18. As will be discussed in more detail below, the GRIN lens holder 16 is designed with internal alignment features that support and align the GRIN lenses 18 in alignment with GRIN lens holder 16 and the plug 12 to avoid or reduce coupling loss between the GRIN lenses 18 and optical components optically connected to the GRIN lens 18 through a mating to the plug 12.

Figure 2A:
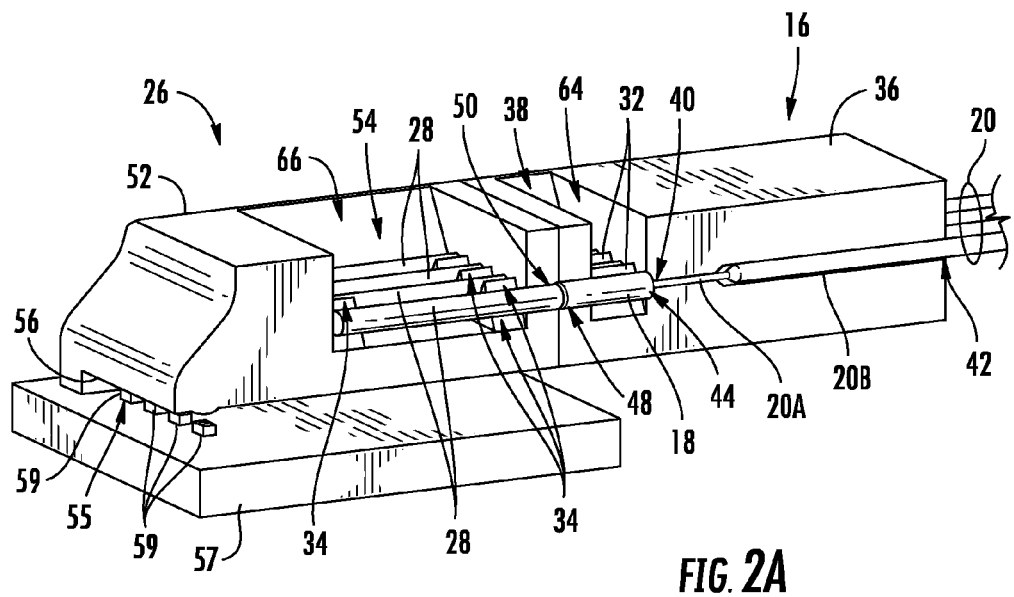
FIG. 2A is a perspective view of the GRIN lens holder of the plug of FIG. 1 mated with a GRIN lens holder for a receptacle, to optically connect GRIN lenses disposed in the GRIN lens holder of the plug with the GRIN lenses disposed in the GRIN lens holder of the receptacle.
Figure 2B:
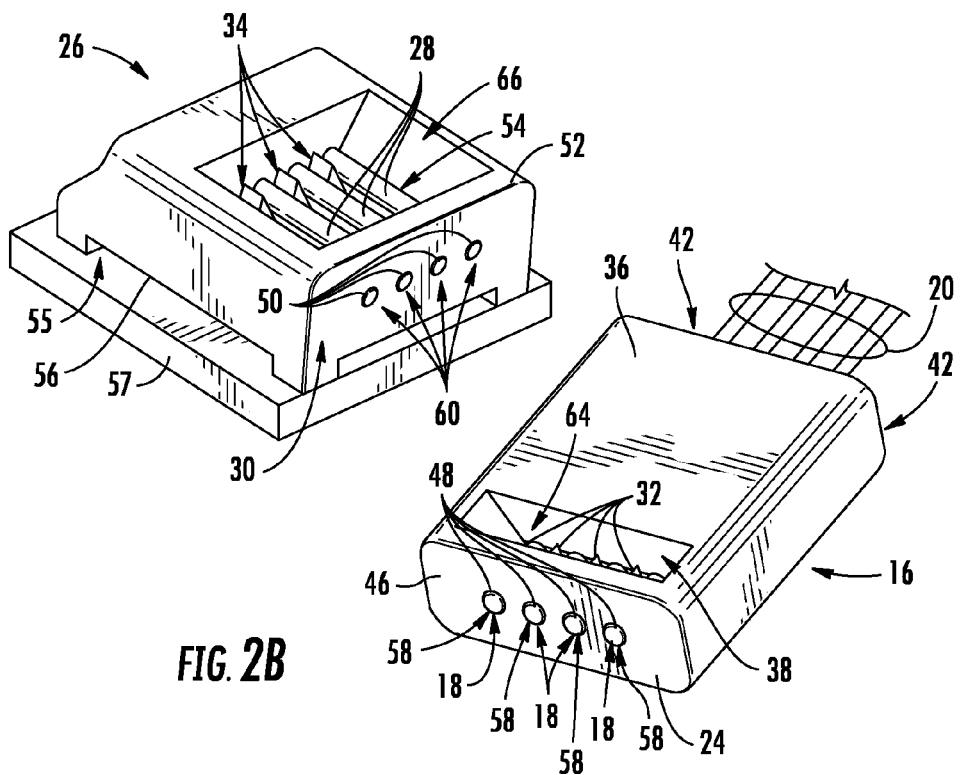
FIG. 2B is a perspective view of the GRIN lens holder of the plug of FIG. 1 and the GRIN lens holder of the receptacle in FIG. 2A unmated.
Figure 2C:
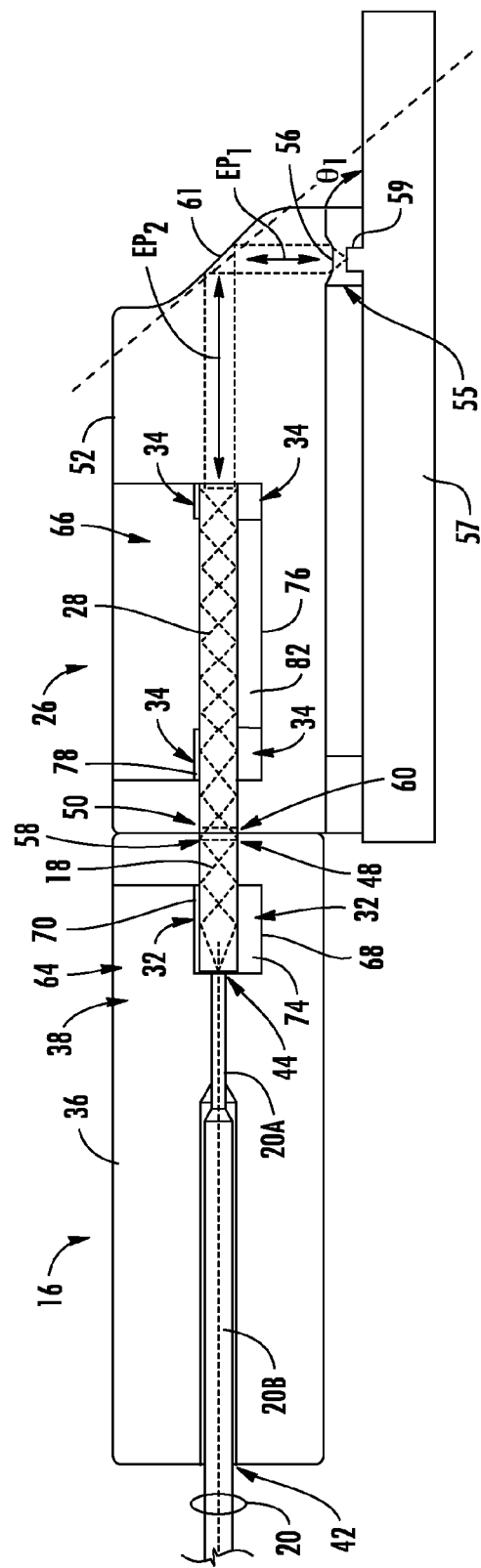
FIG. 2C is a side view of the GRIN lens holder for the plug in FIG. 2A mated to the GRIN lens holder for a receptacle in FIG. 2A.

In this regard, FIG. 2A is a perspective view of the GRIN lens holder 16 of the plug 12 of FIG. 1 mated with a GRIN lens holder 26 for a receptacle connector (not shown). The GRIN lens holder 16 and the GRIN lends holder 26 can be mated to optically connect the GRIN lenses 18 disposed in the GRIN lens holder 16 of the plug 12 with GRIN lenses 28 disposed in the GRIN lens holder 26. FIG. 2B is a perspective view of the GRIN lens holder 16 and the GRIN lens holder 26 in FIG. 2A unmated. FIG. 2C is a side view of the GRIN lens holder 16 mated to the GRIN lens holder 26 in FIG. 2A.

As illustrated in FIGS. 2A and 2C, the mating face 24 of the GRIN lens holder 16 is configured to abut with a mating face 30 (FIG. 2C) of the GRIN lens holder 26 to optically connect their respective supported GRIN lenses 18, 28. It is important that the GRIN lenses 18, 28 be properly aligned with their respective GRIN lens holders 16, 26 and their respective mating faces 24, 30 to avoid or reduce coupling losses when the mating faces 24, 30 are abutted to each other to optically connect their respective supported GRIN lenses 18, 28. In this regard, as illustrated in FIGS. 2A and 2B and discussed in more detail below with regard to FIGS. 3-4B, the GRIN lens holders 16, 26 both contain groove alignment features 32, 34, respectively. The groove alignment features 32, 34 are cuts, indentations, or channels disposed in the surface of the GRIN lens holders 16, 26. The groove alignment features 32, 34 are configured to support the GRIN lenses 18, 28 disposed in the GRIN lens holders 16, 26, and to align the GRIN lenses 18, 28 with the mating faces 24, 30. By providing the groove alignment features 32, 34, the alignment of the GRIN lenses 18, 28 provided by the GRIN lens holders 16, 26 may be more accurate than alternative methods, such as using pins to dispose alignment through-holes or bores in a lens holder body. Using pins to dispose through-holes or bores in lens holder bodies after their manufacture can introduce alignment inaccuracies. To mold bores in a lens holder body would require small mold components that need to slide within each other. This in turn creates heat removal issues as well as negatively impacting overall part and alignment accuracy.

Also, in this embodiment, the groove alignment features 32, 34 are provided as part of an integrated single piece component structure of the GRIN lens holders 16, 26. For example, the groove alignment features 32, 34 can be provided as part of a mold or stamp used to mold or stamp manufacture the GRIN lens holders 16, 26. Mold manufacturing the GRIN lens holders 16, 26 can reduce manufacturing steps, manufacturing cost, and providing accurate alignment of the supported GRIN lenses 18, 28.

As illustrated in FIGS. 2A-2C, the GRIN lens holder 16 for the plug 12 (FIG. 1) in this embodiment is comprised of a lens holder body 36. An internal chamber 38 is disposed in the lens holder body 36. The GRIN lenses 18 are disposed and arranged in the internal chamber 38 as will be discussed in more detail below with regard to FIG. 3. The GRIN lenses 18 can be fused or optically connected to end portions 40 of bare optical fiber portions 20A of coated optical fiber portions 20B of the optical fibers 20 disposed in the internal chamber 38. For example, the bare optical fiber portions 20A may be one hundred twenty-five (125) micrometers (μm) in diameter, and the coated optical fiber portions 20B may be two hundred fifty (250) μm in diameter, as non-limiting examples. To provide for the end portions 40 of the optical fibers 20 to be disposed in the internal chamber 38 of the lens holder body 36, light port openings 42 are disposed in the lens holder body 36. The light port openings 42 are coupled in free space to the internal chamber 38. For example, the light port openings 42 may be holes disposed in the lens holder body 36. The end portions 40 of the optical fibers 20 can be inserted into the light port openings 42 to be optically connected or fused to end portions 44 of the GRIN lenses 18 for optical connection.

With continuing reference to FIGS. 2A-2C, to provide for locating the GRIN lenses 18 in close proximity to other optical components, such as the GRIN lenses 28, the mating face 24 is disposed in the lens holder body 36. The mating face 24 provides a planar or substantially planar mating surface 46 for abutment to another optical component to bring end faces 48 of the GRIN lenses 18 in contact or close contact to the other optical components for light transfer. In this example, the end faces 48 of the GRIN lenses 18, being planar or substantially planar (e.g., within 25-50 μm) to the mating face 24, are optically connected to end faces 50 of the GRIN lenses 28 in the GRIN lens holder 26. In this regard, the GRIN lens holder 26 includes a lens holder body 52. The lens holder body 52 also contains an internal chamber 54 disposed in the lens holder body 52. The GRIN lenses 28 are disposed and arranged in the internal chamber 54 as will be discussed in more detail below with regard to FIGS. 4A and 4B.

With reference to FIG. 2B, the GRIN lenses 28 can be arranged to transfer light, directly or indirectly, through lenses 55 disposed in the surface 56 (FIG. 4B) extending through the lens holder body 52. The lens holder body 52 may be made from a light transmissive material at the desired wavelengths so that the lenses 55 disposed in the surface 56 can receive light from a light source. In this embodiment, the GRIN lens holder 26 is mounted to a printed circuit board (PCB) 57 that contains optical devices 59 (see also, FIG. 4B). For example, the optical devices 59 may be optical transmitters or receivers, for example vertical-cavity surface-emitting lasers (VCSELs) and photodiodes (e.g., pin diodes), respectively. The optical devices 59 are aligned with the lenses 55 for either transmitting light to or receiving light through lenses 55 from the GRIN lenses 28 which are aligned with the lenses 55 in the lens holder body 52. For example, the optical devices 59 may be arranged in an alternating fashion between transmitter and receiver optical devices 59. As shown in FIG. 2C, a total internal reflection (TIR) surface 61 is provided in the lens holder body 52 to reflect light to and from the GRIN lenses 28 disposed therein. For example, the TIR surface 61 may be disposed at angle $\Theta_1$ relative to the emission path $EP_1$, which is forty-five (45) degrees in the non-limiting example of the lens body holder 52. Light received through lenses 55 transmitted from a transmitter optical device 59 disposed on a surface 56 is emitted in emission path $EP_1$. This light is reflected off of the TIR surface 61 into emission path $EP_2$ to the GRIN lenses 28. Similarly, light received from the GRIN lenses 28 in emission path $EP_2$ is reflected off of the TIR surface 61 into emission path $EP_2$ to be transmitted to the lenses 55 and received by a receiver optical device 59.

Note that the lens holder bodies 36, 52 may be constructed from a polymer or any other material that is suitable for supporting the GRIN lenses 18, 28 and the optical fibers 20 disposed in the lens holder bodies 36, 52. As non-limiting examples, the lens holder bodies 36, 52 may be produced from a mold in a molding process. For example, the lens holder bodies 36, 52 in this embodiment are provided as a one-piece component to provide seamless mating faces 24, 30. Providing seamless mating faces 24, 30 can reduce the potential for debris to enter through or be deposited in the seams and come into contact with the GRIN lenses 18, 28 resulting in light transfer losses.

With reference to FIGS. 2A and 2C, to provide external access to the GRIN lenses 18, 28 through the lens holder bodies 36, 52, the GRIN lens holders 16, 26 both contain lens openings 58, 60, respectively. The lens openings 58, 60 are disposed in the mating faces 24, 30 of the lens holder bodies 36, 52 and coupled in free space to their respective internal chambers 38, 54. The lens openings 58, 60 are configured to receive the end faces 48, 50 of the GRIN lenses 18, 28. The groove alignment features 32, 34 in the respective lens holder bodies 36, 52 are optically aligned with the lens openings 58, 60, respectively. In this regard, when the GRIN lenses 18, 28 are supported by the groove alignment features 32, 34, the GRIN lenses 18, 28 and their end faces 48, 50 are aligned with the lens openings 58, 60 and their mating faces 24, 30. In this manner, the GRIN lenses 18, 28 are aligned to each other when their respective GRIN lens holders 16, 26 are mated. Further, it may be desired to provide the lens openings 58, 60 of an inner diameter that provides a clearance between the lens openings 58, 60 and GRIN lenses 18, 28, respectively, when supported in the lens holder bodies lens openings 58, 60. For example, a clearance may be between five (5) and ten (10) µm.

With continuing reference to FIGS. 2A and 2C, to install the GRIN lenses 18 in the GRIN lens holder 16, the GRIN lenses 18 may be disposed in the groove alignment features 32 in the internal chamber 38 through an opening in the lens holder body 36. Alternatively, the GRIN lenses 18 may be inserted through the lens openings 58 disposed in the mating face 24 of the lens holder body 36 until the end faces 48 of the GRIN lenses 18 are planar or substantially planar (e.g., within 25-50 µm) with the mating face 24. An epoxy, gel, or adhesive that has an index of refraction for index matching may be disposed in the opening 64 to secure the GRIN lenses 18 in the groove alignment features 32 of the lens holder body 36, and to seal off access to the GRIN lenses 18 in the internal chamber 38 of the lens holder body 36. As discussed above, the optical fibers 20 may be disposed in the lens holder body 36 through the light port openings 42. End portions 40 of the bare optical fiber portions 20A, provided by removing coating from coated optical fiber portions 20B, may be inserted through the light port openings 42. The bare optical fiber portions 20A may be brought into contact, fused, or in close contact with the end portions 44 of the GRIN lenses 18 to optically connect the optical fibers 20 with the GRIN lenses 18.

Similarly, with continuing reference to FIGS. 2A and 2C, to install the GRIN lenses 28 in the GRIN lens holder 26, the GRIN lenses 28 may be disposed in the groove alignment features 34 in the internal chamber 54 through an opening 66 in the lens holder body 52. Alternatively, the GRIN lenses 28 may be inserted through the lens openings 60 disposed in the mating face 30 of the lens holder body 52 until the end faces 50 of the GRIN lenses 28 are planar or substantially planar (e.g., within 25-50 µm) with the mating face 30. An epoxy, gel, or adhesive that has an index of refraction for index matching may be disposed in the opening 66 to secure the GRIN lenses 28 in the groove alignment features 34 of the lens holder body 52, and to seal off access to the GRIN lenses 28 in the internal chamber 54 of the lens holder body 52.

Figure 3:
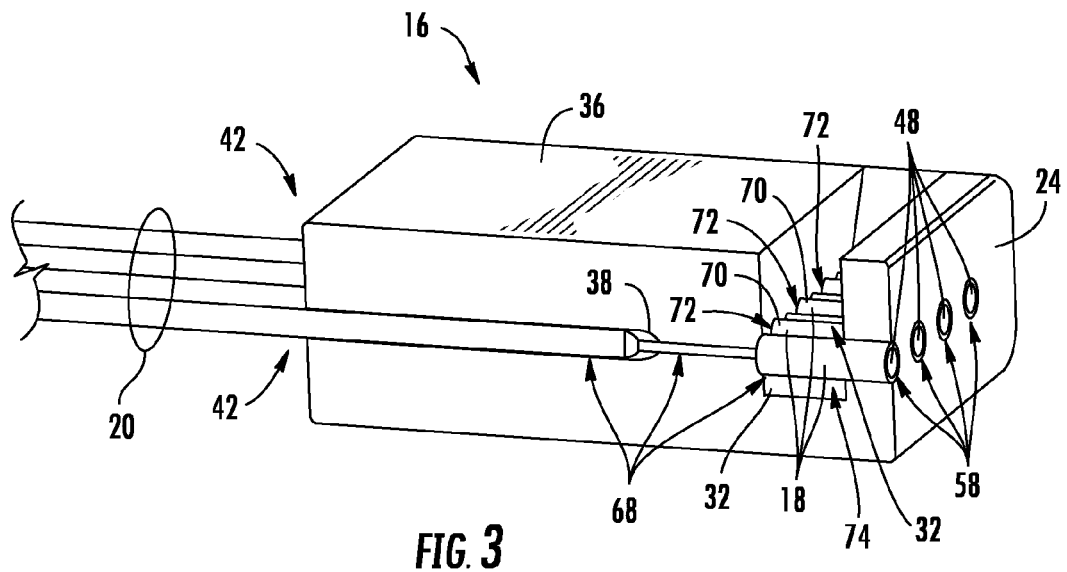
FIG. 3 is a close-up perspective view of the GRIN lens holder of the plug in FIG. 1 with GRIN lenses disposed in groove alignment features internal to the seamless lens holder body of the GRIN lens holder.

To provide further detail on the groove alignment features 32 disposed in the GRIN lens holder 16 of the plug 12 in FIG. 1, FIG. 3 is provided. FIG. 3 is a close-up perspective view of the GRIN lens holder 16 of the plug 12 in FIG. 1. FIGS. 2C and 3 illustrate more detail on the GRIN lenses 18 as disposed in the groove alignment features 32 to align the GRIN lenses 18 with the lens openings 58, mating face 24, and/or the light port openings 42. In this embodiment, the groove alignment features 32 are disposed in a recessed floor 68 in the internal chamber 38 of the GRIN lens holder 16. The groove alignment features 32 are formed by disposing wedge-shaped members 70 side-by-side on each side of the recessed floor 68 (FIG. 2C) of the internal chamber 38. Side-by-side wedge-shaped members 70 form V-shaped grooves 72 therebetween that can support each end of the GRIN lenses 18 in the internal chamber 38.

With continuing reference to FIG. 3, the wedge-shaped members 70 are disposed in the internal chamber 38 such that the V-shaped grooves 72 are aligned with the lens openings 58. The V-shaped grooves 72 are not extended into the lens openings 58 in this embodiment. The GRIN lenses 18 disposed in the V-shaped grooves 72 are thus aligned with the lens openings 58. The V-shaped grooves 72 could also be disposed in the internal chamber 38 to be aligned with the light port openings 42, as provided in the lens holder body 36. The V-shaped grooves 72 also provide standoffs for the GRIN lenses 18 to be disposed with a gap 74 to the recessed floor 68 (FIG. 2C) of the internal chamber 38. Providing for the gap 74 allows any debris or other material inside the internal chamber 38 to be collected out of contact with the GRIN lenses 18 to avoid light transfer losses.

Figure 4A:
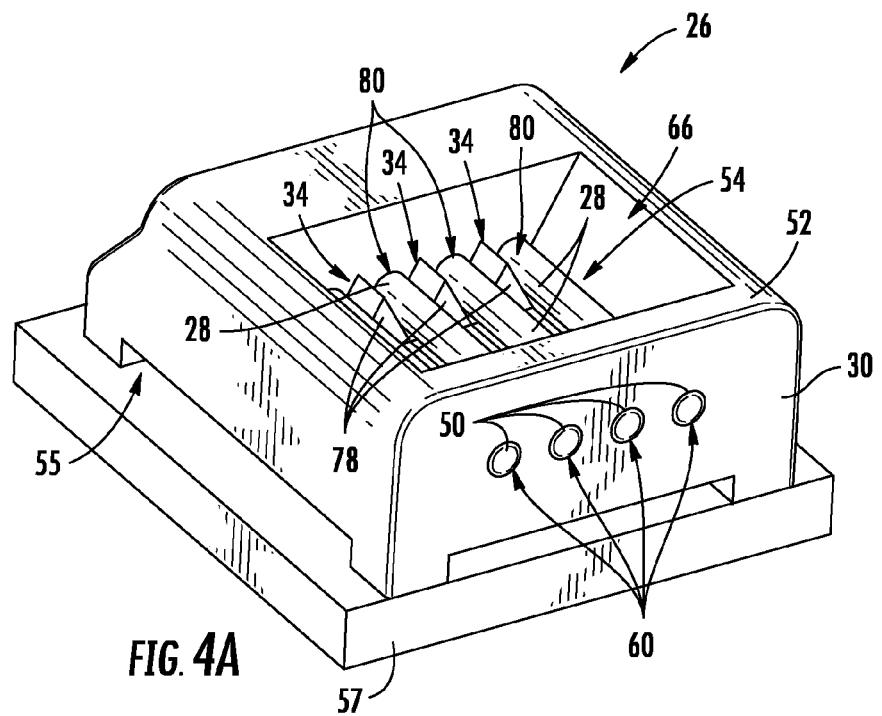
FIG. 4A is a close-up perspective view of the GRIN lens holder and optical device in FIG. 2A, with GRIN lenses secured in groove alignment features disposed internally in the seamless lens holder body of the receptacle GRIN lens holder.
Figure 4B:
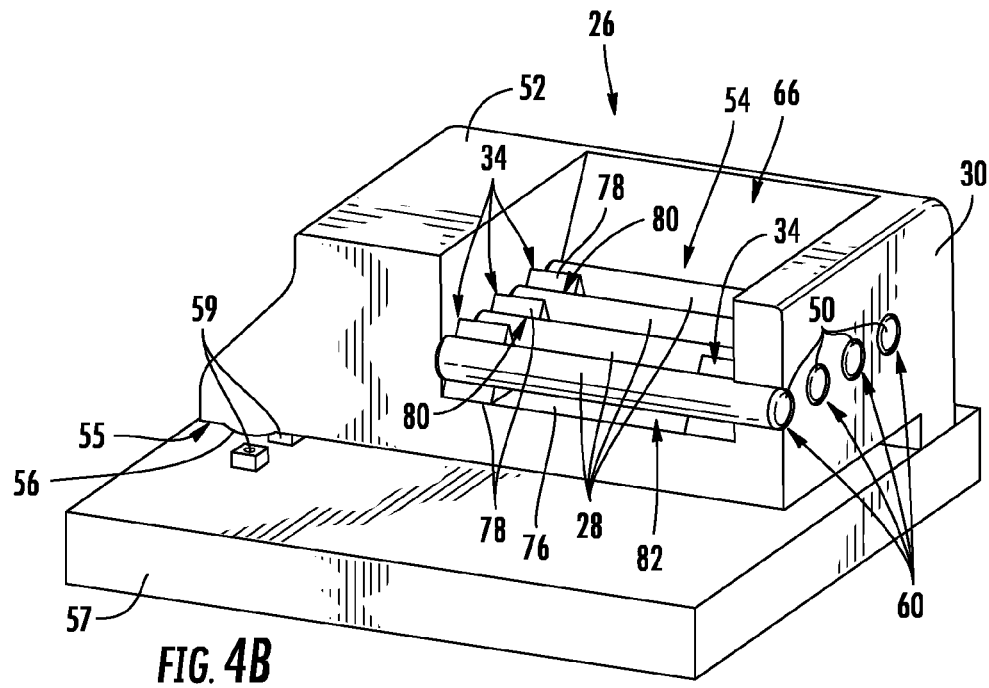
FIG. 4B is a close-up perspective cross-section view of the seamless lens holder body of the receptacle GRIN lens holder in FIG. 4A.
Figure 4C:
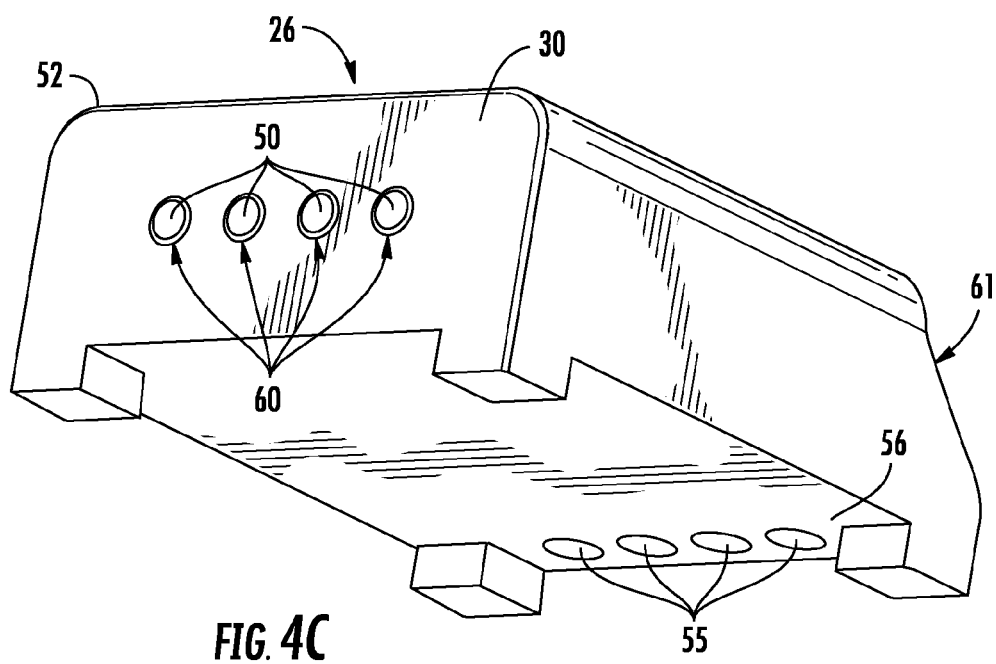
FIG. 4C is a close-up bottom perspective view of the GRIN lens holder and optical device in FIG. 2A.

To provide further detail on the groove alignment features 34 disposed in the GRIN lens holder 26 in FIGS. 2A-2C, FIGS. 4A-4C are provided. FIG. 4A is a close-up perspective view of the receptacle GRIN lens holder 26 mounted on a PCB 57 in FIG. 2A, also with GRIN lenses 28 secured in groove alignment features disposed internally in GRIN lens holder 26. FIG. 4B is the close-up perspective cross-section view of the GRIN lens holder 26 in FIG. 4A. FIG. 4C is the close-up bottom perspective view of the GRIN lens holder 26 in FIG. 4A. FIGS. 4A-4C illustrate in more detail the GRIN lenses 28 as disposed in the groove alignment features 34 to align the GRIN lenses 28 with the lens openings 60, mating face 30, and/or the lenses 55. In this embodiment, the groove alignment features 34 are disposed in a recessed floor 76 in the internal chamber 54 of the GRIN lens holder 26. The groove alignment features 34 are formed by disposing wedge-shaped members 78 side-by-side on each side of the recessed floor 76 of the internal chamber 54. Side-by-side wedge-shaped members 78 form V-shaped grooves 80 therebetween that can support each end of the GRIN lenses 28 in the internal chamber 54. The wedge-shaped members 78 are disposed in the internal chamber 54 such that the V-shaped grooves 80 are aligned with the lens openings 60.

With reference to FIGS. 4A and 4B, the V-shaped grooves 80 are not extended into the lens openings 60 in this embodiment. The GRIN lenses 28 disposed in the V-shaped grooves 80 are thus aligned with the lens openings 60. The V-shaped grooves 80 could also be disposed in the internal chamber 54 to be aligned with the lenses 55, as provided in the lens holder body 52. The V-shaped grooves 80 also provide standoffs for the GRIN lenses 28 to be disposed with a gap 82 to the recessed floor 76 of the internal chamber 54. Providing for the gap 82 allows any debris or other material inside the internal chamber 54 to be collected out of contact with the GRIN lenses 28 to avoid light transfer losses. With reference to FIG. 4C, the lenses 55 are shown, that are provided by the light transmissive material of the lens body holder 52 aligned in the emission path $EP_1$, illustrated in FIG. 2C.

Figure 5C:
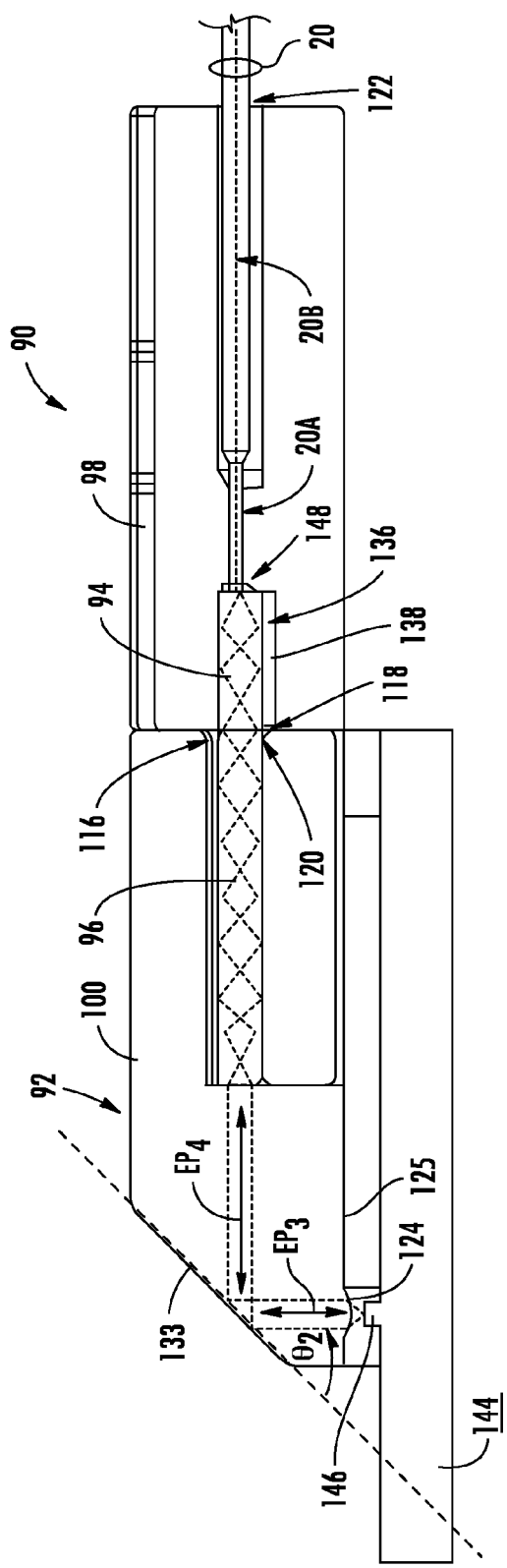
FIG. 5C is a side view of the GRIN lens holders in FIG. 5A mated together.

Other forms of GRIN lens holders can be provided that contain groove alignment features for supporting and aligning GRIN lenses. In this regard, FIGS. 5A and 5B are left and right perspective views, respectively, of an alternative exemplary GRIN lens holder 90 that can be mated with an alternative exemplary GRIN lens holder 92. FIG. 5C is a side view of the GRIN lens holders 90, 92 in FIG. 5A mated together. For example, the GRIN lens holder 90 could be disposed in a plug and the GRIN lens holder 92 could be disposed in a receptacle, such that when the plug and receptacle are mated, the GRIN lens holders 90, 92 are mated. Mating of the GRIN lens holders 90, 92 optically connects GRIN lenses 94 disposed in the GRIN lens holder 90 with GRIN lenses 96 disposed in the GRIN lens holder 92. In this embodiment, the GRIN lens holders 90, 92 employ lens holder bodies 98, 100 that are configured with open recesses 102, 104 (FIGS. 6A, 6B, 7A) to receive recessed covers 106, 108 at or below the lens holder bodies 98, 100, respectively, to seal off their internal chambers 110, 112 (FIGS. 6A, 6B, 7A) disposed therein. The GRIN lenses 94, 96 are disposed in the internal chambers 110, 112 in groove alignment features 114, 116 to align the GRIN lenses 94, 96 with the lens holder bodies 98, 100 and lens openings 118, 120 (FIGS. 6C, 7B) formed by the disposing of the recessed covers 106, 108 in the open recesses 102, 104 of the lens holder bodies 98, 100. Alternatively, the groove alignment features 114, 116 could be disposed in the recessed covers 106, 108, respectively, instead of the lens holder bodies 98, 100.

With continuing reference to FIGS. 5A-5C, by providing the open recesses 102, 104 in the lens holder bodies 98, 100, the GRIN lenses 94, 96 can be disposed in the lens holder bodies 98, 100 through the internal chambers 110, 112 when the recessed covers 106, 108 are removed. An epoxy, gel, or adhesive that has an index of refraction for index matching can then be disposed in the internal chambers 110, 112, and the recessed covers 106, 108 disposed in the open recesses 102, 104 to seal off the internal chambers 110, 112 and secure the GRIN lenses 94, 96 inside the lens holder bodies 98, 100. This is opposed to having to dispose the GRIN lenses 94, 96 through lens openings 118, 120 and light port openings 122 and lenses 124.

With continuing reference to FIGS. 5A-5C, GRIN lens holders 90, 92 with separate lens holder bodies 98, 100 and recessed covers 106, 108 may also be more easily molded or stamped or less costly to mold as a non-limiting example. However, providing separate lens holder bodies 98, 100 and recessed covers 106, 108 provides two piece mating faces 126A, 126B and 128A, 128B (FIGS. 5A, 5B, 6C, 7B) that include seams 130, 132 in the GRIN lens holders 90, 92 along the interface of the lens holder bodies 98, 100 and the recessed covers 106, 108. The recessed cover 106 and lens holder body 98 provide mating faces 126A, 126B, respectively, that form a combined planar or substantially planar surface when the recessed cover 106 is properly disposed in the lens holder body 98. Similarly, the recessed cover 108 and lens holder body 100 provide mating faces 128A, 128B, respectively, that form a combined planar or substantially planar surface when the recessed cover 108 is properly disposed in the lens holder body 100. The seams 130, 132 created as a result of separate mating faces 126A, 126B and 128A, 128B in the GRIN lens holders 90, 92, respectively, provide additional entry locations for debris to enter into the internal chambers 110, 112 if not fully sealed. Further, as discussed below, the lens holder bodies 98, 100 in this embodiment are also designed with raised sides 129A, 129B and 131A, 131B, respectively, that define internal chambers 110, 112 for receiving the recessed covers 106, 108. The raised sides 129A, 129B and 131A, 131B can provide increased stability of the lens holder bodies 98, 100 in the Y-axis direction.

As illustrated in FIGS. 5A and 5B, the mating faces 126, 128 of the GRIN lens holder 90 are configured to abut with the mating face 128 of the GRIN lens holder 92 to optically connect their respective supported GRIN lenses 94, 96. It is important that the GRIN lenses 94, 96 be properly aligned with their respective GRIN lens holders 90, 92 and their respective mating faces 126, 128 to avoid or reduce coupling losses when the mating faces 126, 128 are abutted to each other to optically connect their respective supported GRIN lenses 94, 96. In this regard, as illustrated in FIGS. 6A-7B, the GRIN lens holders 90, 92 both contain the groove alignment features 114, 116, respectively. The groove alignment features 114, 116 are configured to support the GRIN lenses 94, 96 disposed in the GRIN lens holders 90, 92, and to align the GRIN lenses 94, 96 with the mating faces 126, 128. Also, in this embodiment, the groove alignment features 114, 116 can be provided as part of an integrated structure of the GRIN lens holders 90, 92. For example, the groove alignment features 114, 116 can be provided as part of a mold used to mold manufacture the GRIN lens holders 90, 92. Mold manufacturing the GRIN lens holders 90, 92 can reduce manufacturing steps, manufacturing cost, and provide accurate alignment of the supported GRIN lenses 94, 96.

As shown in FIG. 5C, a TIR surface 133 is provided in the lens holder body 92 to reflect light to and from the GRIN lenses 96 disposed therein. For example, the TIR surface 133 may be disposed at angle $\Theta_2$ relative to the emission path $EP_3$, which is forty-five (45) degrees in the non-limiting example of the lens holder body 100. Light can be received through lenses 124 from a transmitting optical device 146 disposed on a substrate shown as a printed circuit board 144 is emitted in emission path $EP_2$. This light is reflected off of the TIR surface 133 into emission path $EP_4$ to the GRIN lenses 96. Similarly, light received from the GRIN lenses 96 in emission path $EP_4$ is reflected off of the TIR surface 133 into emission path $EP_3$ and transmitted to the lenses 124, which can be received by a receiving optical device 146.

Figure 6A:
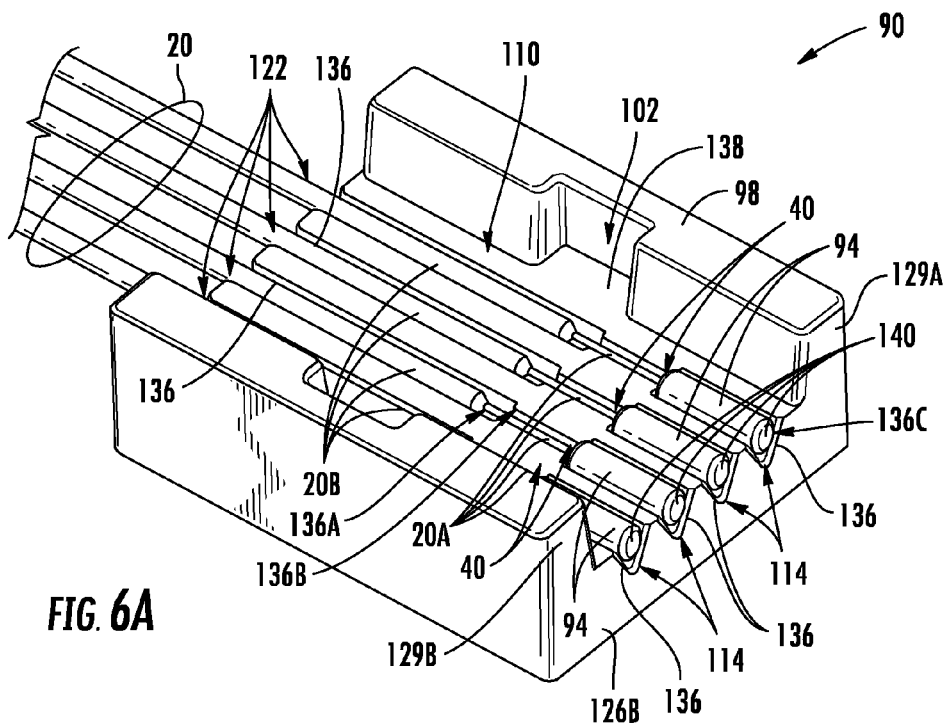
FIG. 6A is a close-up perspective view of the recessed cover GRIN lens holder in FIGS. 5A-5C with the recessed cover removed from the recessed lens holder body.
Figure 6B:
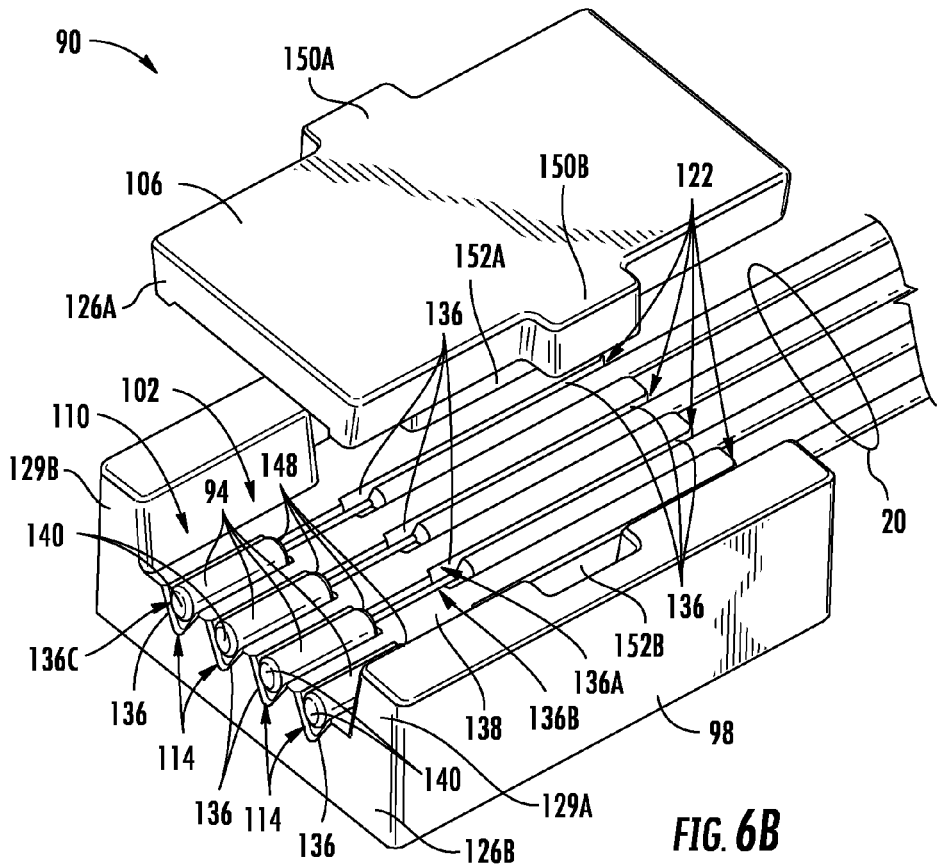
FIG. 6B is a close-up perspective exploded view of the recessed cover GRIN lens holder in FIGS. 5A-5C.
Figure 6C:
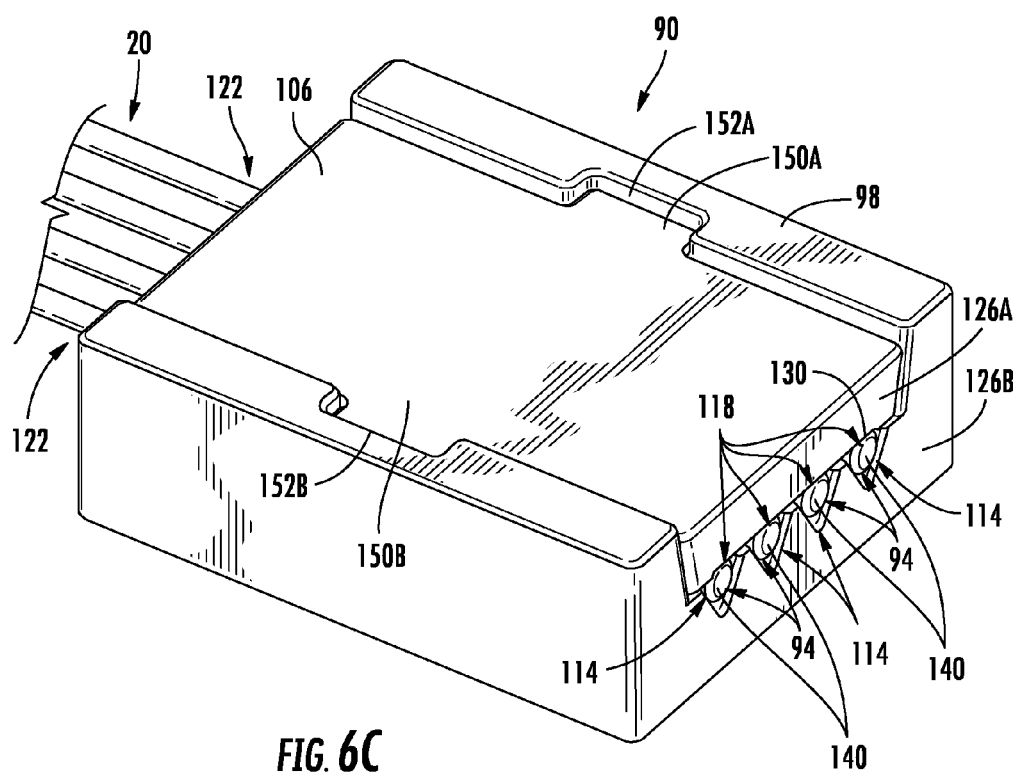
FIG. 6C is a close-up perspective assembled view of the recessed cover GRIN lens holder in FIGS. 5A-5C.

More detail regarding the GRIN lens holder 90 in FIGS. 6A-6C and the GRIN lens holder 92 in FIGS. 7A and 7B will now be discussed. FIG. 6A is a close-up perspective view of the GRIN lens holder 90 of FIGS. 5A and 5B with the recessed cover 106 removed from the recessed lens holder body 98. FIGS. 6B and 6C are close-up perspective exploded and assembled views, respectively, of the GRIN lens holder 90 in FIGS. 5A and 5B. With reference to FIGS. 6A and 6B, the GRIN lenses 94 disposed in the lens holder body 98 of the GRIN lens holder 90 can be fused or optically connected to end portions 40 of bare optical fiber portions 20A of coated optical fiber portions 20B of the optical fibers 20 disposed in the internal chamber 110. The end portions 40 of the optical fibers 20 are disposed in groove alignment features provided as V-shaped grooves 136 disposed in a recessed floor 138 of the internal chamber 110 of the lens holder body 98. The recessed floor 138 is disposed between the raised sides 129A, 129B forming the internal chamber 110. The V-shaped grooves 136 support and align the optical fibers 20 and the GRIN lenses 94 in the lens holder body 98. The V-shaped grooves 136 extend in the recessed floor 138 in lens holder body 94 to form the lens openings 118 to the light port openings 122, which are both coupled in free space to the internal chamber 110. The V-shaped grooves 136 in this embodiment are also comprised of three different groove sections 136A, 136B, 136C that each have different groove sizes to accommodate and securely support the different outer diameter sized coated optical fibers 20B, the bare optical fibers 20A, and GRIN lenses 94, respectively.

With continuing reference to FIGS. 6A-6C, to provide for locating the GRIN lenses 94 in close proximity to other optical components, such as the GRIN lenses 96, the mating faces 126, 128 are disposed in the lens holder body 90. The mating faces 126, 128 provides a planar or substantially planar mating surface for abutment to another optical component to bring end faces 140 of the GRIN lenses 94 in contact or close contact to the other optical components for light transfer. In this example, the end faces 140 of the GRIN lenses 94, being planar or substantially planar (e.g., within 25-50 μm) to the mating faces 126A, 126B and 128A, 128B are optically connected to end faces 142 of the GRIN lenses 96 in the GRIN lens holder 92, as illustrated in FIGS. 7A and 7B. With reference to FIGS. 7A and 7B, the GRIN lenses 96 can be arranged to transfer light, directly or indirectly, through lenses 124 disposed in a surface 125 in the lens holder body 100. The GRIN lenses 96 can be arranged to transfer light, directly or indirectly, through lenses 124 disposed in the surface 125 extending through the lens holder body 100. The lens holder body 100 may be made from a light transmissive material at the desired wavelengths so that the lenses 124 disposed in the surface 125 can receive light from a light source. In this embodiment, as illustrated in FIG. 7A, the GRIN lens holder 92 is mounted to a printed circuit board (PCB) 144 that contains the optical devices 146. The optical devices 146 are aligned with the lenses 124 for either directing light to or receiving light from lenses 124 and the GRIN lenses 96, which are aligned with the lenses 124 in the lens holder body 100.

With continuing reference to FIGS. 6A-6C, to install the GRIN lenses 94 in the GRIN lens holder 90, the GRIN lenses 94 may be disposed in the V-shaped grooves 136 in the internal chamber 110. The end faces 140 of the GRIN lenses 94 are planar or substantially planar (e.g., within 25-50 μm) with the mating faces 126, 128. An epoxy, gel, or adhesive that has an index of refraction for index matching may be disposed in the open recess 102 to secure the GRIN lenses 94 in the V-shaped grooves 136 of the lens holder body 98 and to seal off access to the GRIN lenses 94 in the internal chamber 110 of the lens holder body 98. As discussed above, the optical fibers 20 may be disposed in the V-shaped grooves 136 in the lens holder body 98. End portions 40 of the bare optical fiber portions 20A, provided by removing coating from coated optical fiber portions 20B, may be inserted in the V-shaped grooves 136. The bare optical fiber portions 20A may be brought into contact, fused, or in close contact with the ends 148 of the GRIN lenses 94, as illustrated in FIG. 6B, to optically connect the optical fibers 20 with the GRIN lenses 94.

After the GRIN lenses 94 and optical fibers 20 are installed in the V-shaped grooves 136 in the lens holder body 98 in FIG. 6A and epoxy, gel, or adhesive is inserted in the internal chamber 110, the recessed cover 106 is ready to be installed. As illustrated in FIG. 6B, the recessed cover 106 contains two mating features 150A, 150B that are configured to interface with two mating recesses 152A, 152B disposed in the lens holder body 98. The recessed cover 106 is inserted into the open recess 102 with the mating features 150A, 150B disposed in the recesses 152A, 152B. The mating of the recessed cover 106 with the open recess 102 forms the lens openings 118 and the light port openings 122 in the GRIN lens holder 90.

Figure 7A:
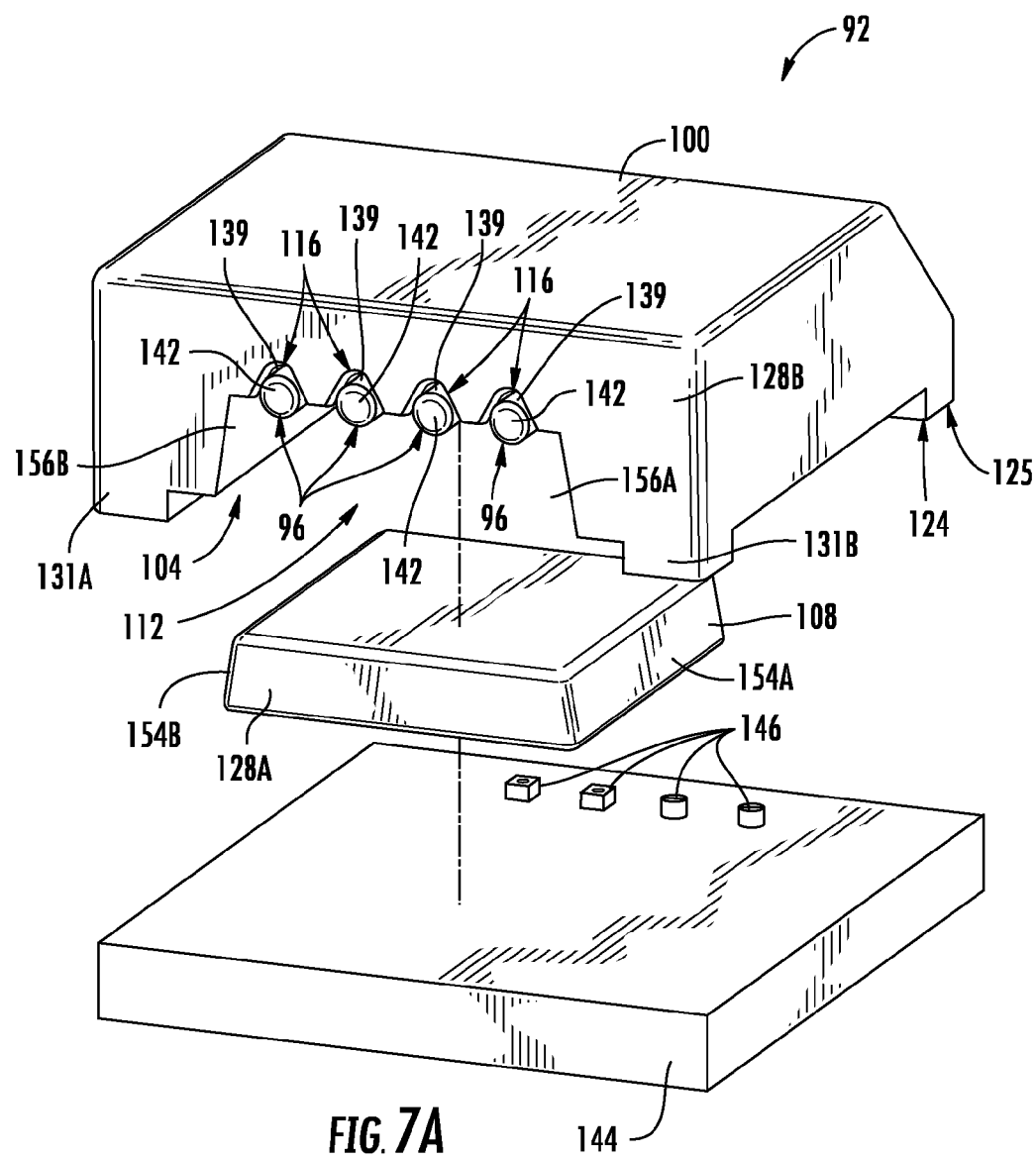
FIG. 7A is a close-up perspective exploded view of the recessed cover GRIN lens holder in FIGS. 5A-5C.
Figure 7B:
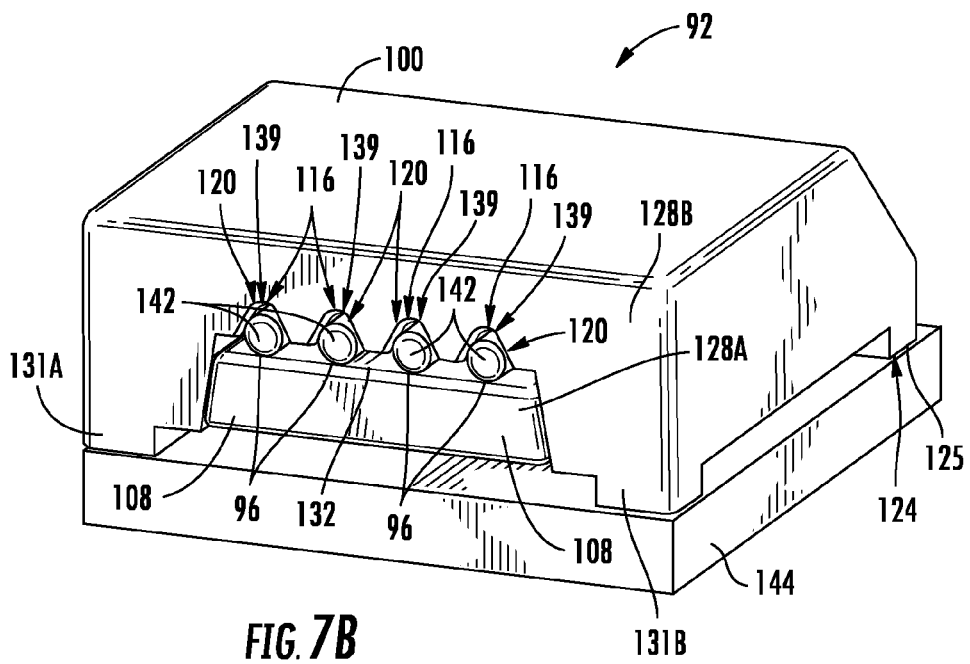
FIG. 7B is a close-up perspective assembled view of the recessed cover GRIN lens holder in FIGS. 5A-5C.
Figure 7C:
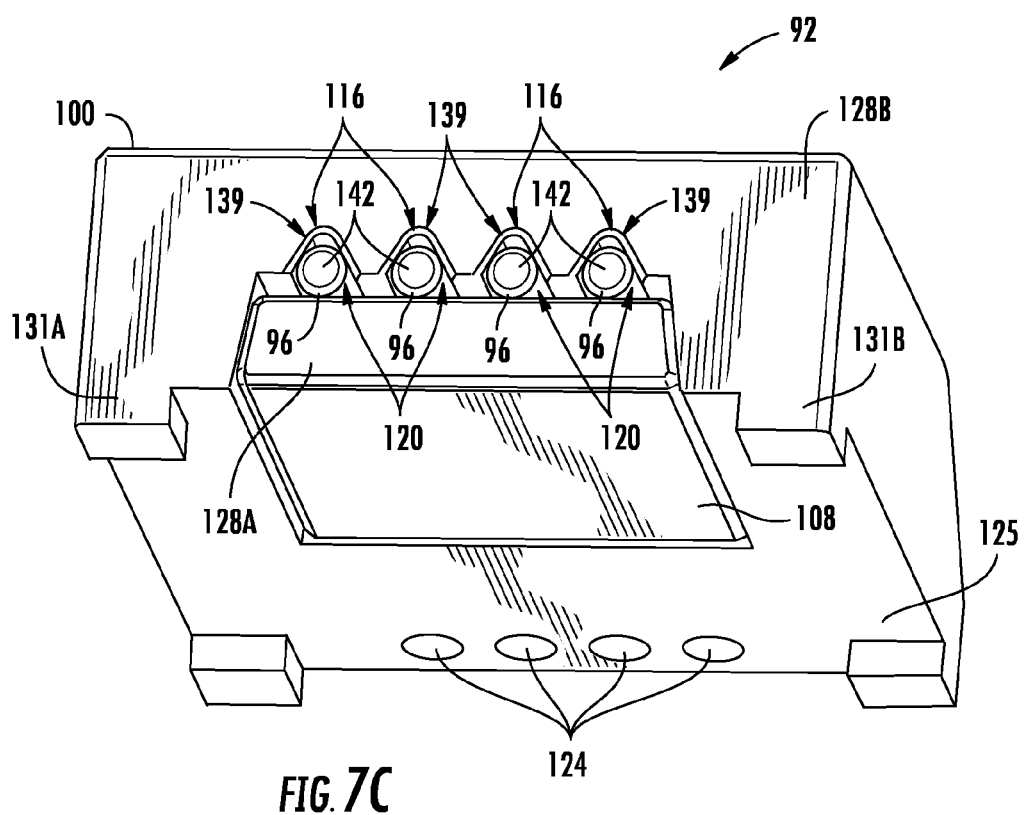
FIG. 7C is a close-up bottom perspective view of the recessed cover GRIN lens holder in FIGS. 5A-5C.

FIGS. 7A and 7B are close-up perspective exploded and assembled views, respectively, of the GRIN lens holder 92 in FIGS. 5A-5C. FIG. 7C is a bottom perspective view of the assembled GRIN lens holder 92 in FIGS. 5A-5C that illustrates the lenses 124 disposed in the surface 125 of the lens holder body 100. To install the GRIN lenses 96 in the GRIN lens holder 92, the GRIN lenses 96 may be disposed in V-shaped grooves 139 in the internal chamber 112. The end faces 142 of the GRIN lenses 96 are planar or substantially planar (e.g., within 25-50 μm) with the mating face 128. An epoxy, gel, or adhesive that has an index of refraction for index matching may be disposed in the open recess 104 to secure the GRIN lenses 96 in the V-shaped grooves 139 of the lens holder body 100 and to seal off access to the GRIN lenses 96 in the internal chamber 112 of the lens holder body 100.

With reference to FIGS. 7A and 7B, after the GRIN lenses 96 are installed in the V-shaped grooves 139 in the lens holder body 100 and epoxy, gel, or adhesive is inserted in the internal chamber 112, the recessed cover 108 is ready to be installed. As illustrated in FIG. 7A, the recessed cover 108 contains two mating surfaces 154A, 154B that are configured to interface with two mating recesses 156A, 156B disposed in the lens holder body 100. The recessed cover 108 is inserted into the open recess 104 with the mating surfaces 154A, 154B disposed in the mating recesses 156A, 156B. The mating of the recessed cover 108 with the open recess 104 forms the lens openings 120 and the lenses 124 in the GRIN lens holder 92.

Figure 8:
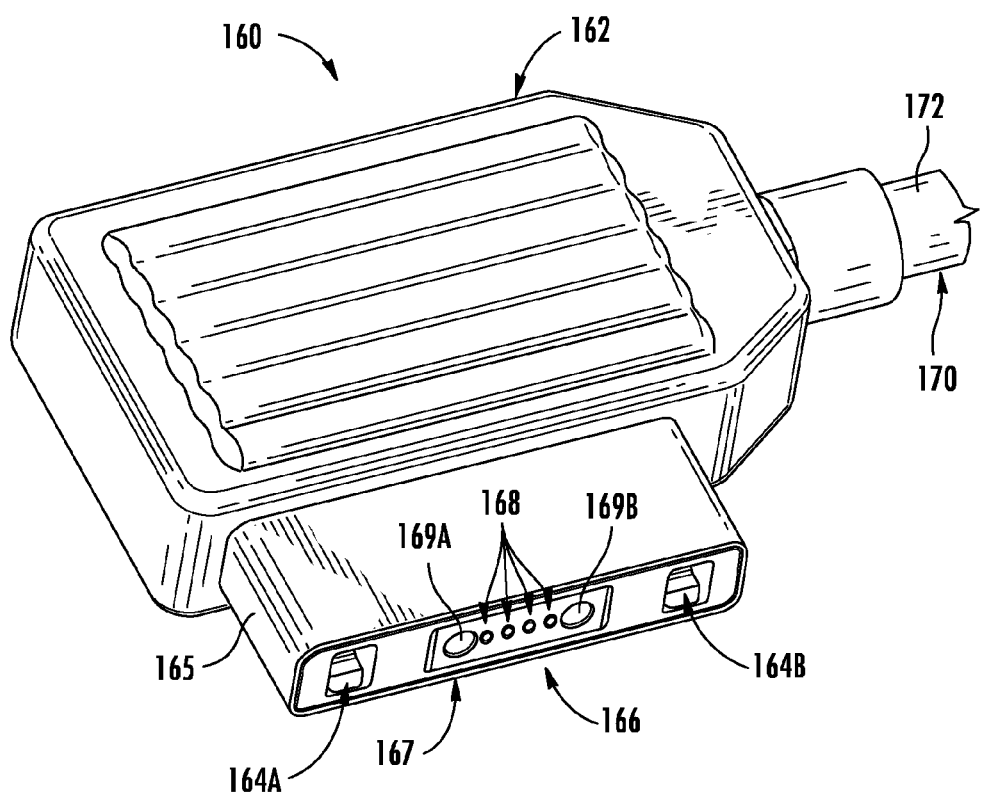
FIG. 8 is a perspective view of another exemplary cable plug employing a gradient index (GRIN) lens holder comprised of a GRIN lens holder employing a recessed cover lens holder body.

FIG. 8 is a perspective view of another exemplary connector 160 employing an alternative recessed cover GRIN lens holder 166 configured to support and align GRIN lenses. As discussed in more detail below, in this embodiment, the GRIN lens holder 166 includes internal groove alignment features to support GRIN lenses that are square or rectangular shaped, as opposed to elliptical, circular, or V-shaped. The connector 160 in this embodiment is provided in the form of a plug 162. For example, the plug 162 may be a fiber optic connection plug that exclusively supports optical components for establishing optical connections. Alternatively, the plug 162 may also include electrical components, such as power conductors 164A, 164B disposed in the plug 162, for establishing electrical connections.

With continuing reference to FIG. 8, the plug 162 in this embodiment employs the gradient index (GRIN) lens holder 166 to support optical components for establishing optical connections, similar to the plug 12 in FIG. 1. As will be discussed in more detail below, the GRIN lens holder 166 is comprised of split component bodies instead of a one piece component in this embodiment. The GRIN lens holder 166 is disposed in a connector housing 165 of the plug 162. The GRIN lens holder 166 could be disposed in a ferrule 167 that is disposed in the connector housing 165. The GRIN lens holder 166 is configured to support and align one or more GRIN lenses 168 disposed in the GRIN lens holder 166. For example, the GRIN lens holder 166 disposed in the plug 162 in FIG. 8 is configured to support up to four (4) GRIN lenses 168. The GRIN lenses 168 are optically coupled or fused to optical fibers 170 disposed in a cable 172 secured to the plug 162. In this manner, an optical connection made to the GRIN lenses 168 disposed in the GRIN lens holder 166 through a mating of the plug 162 to a receptacle or other optical component establishes an optical connection to the optical fibers 170. Alignment openings 169A, 169B are disposed in the plug 162 to assist in alignment of the plug 162 to a receptacle when the plug 162 is mated to a receptacle.

Figure 9A:
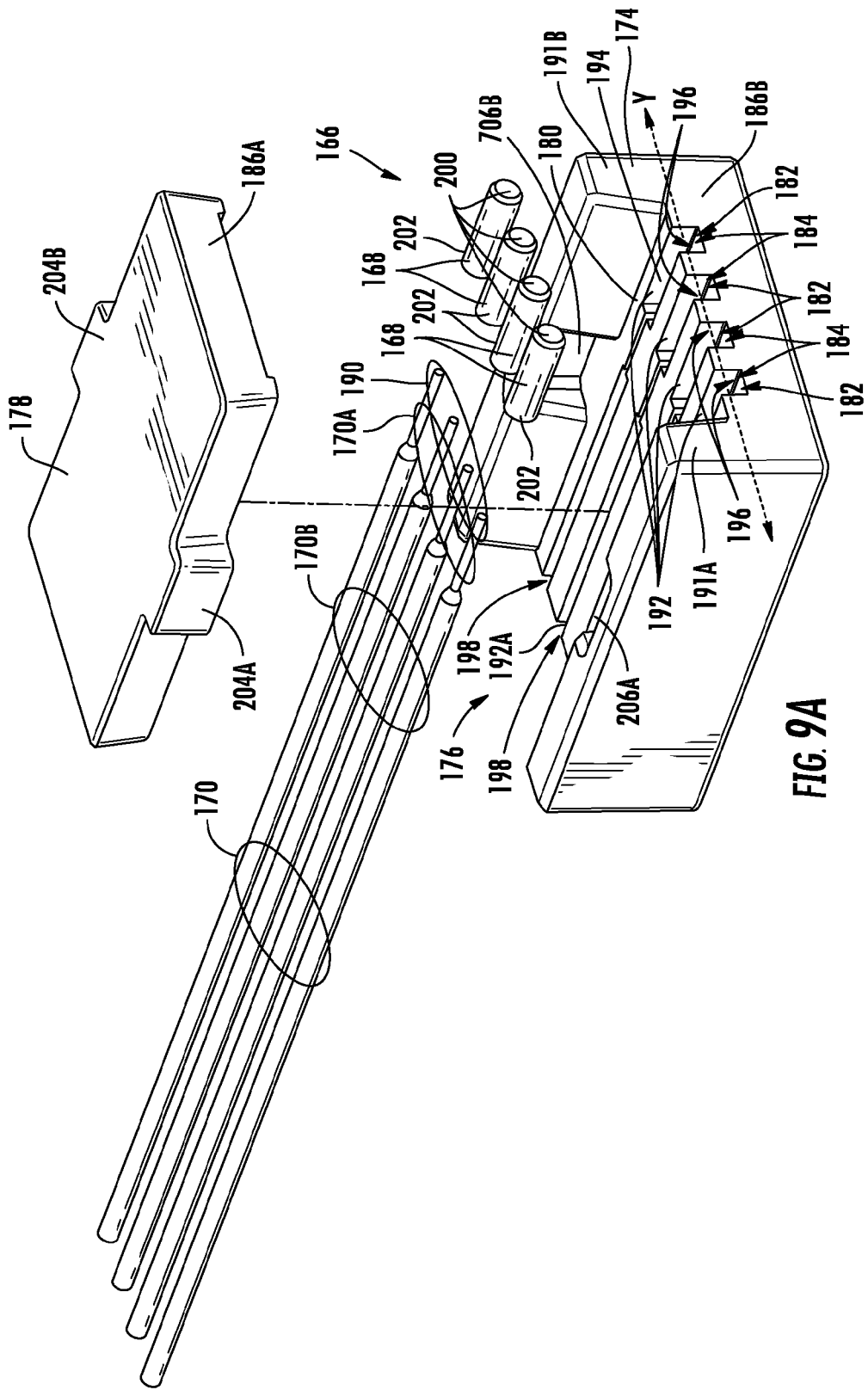
FIG. 9A is a close-up perspective exploded view of the recessed cover GRIN lens holder disposed in the plug in FIG. 8.
Figure 9B:
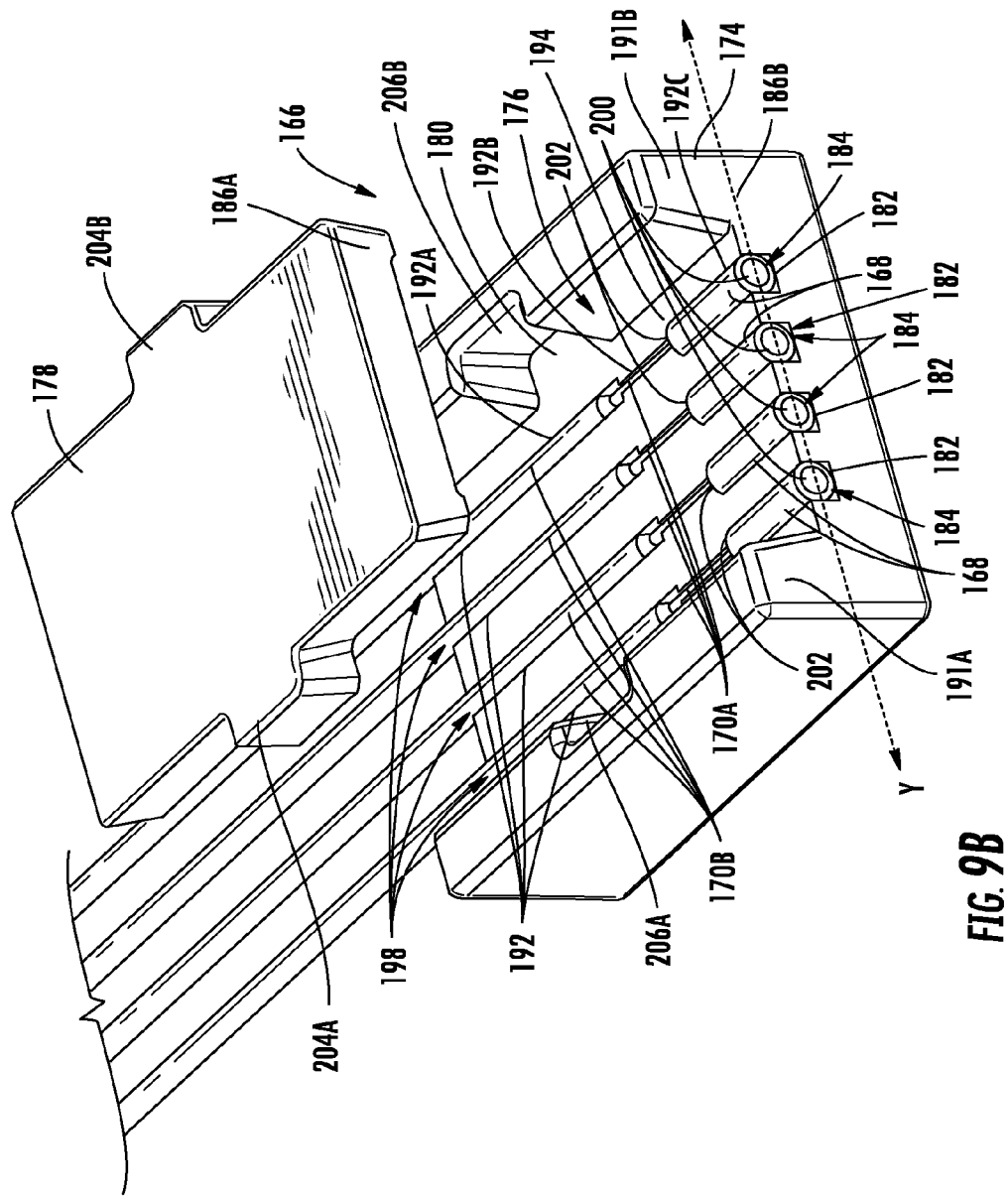
FIG. 9B is a close-up perspective exploded view of the recessed cover GRIN lens holder in FIG. 9A with optical fibers and GRIN lenses installed.
Figure 9C:
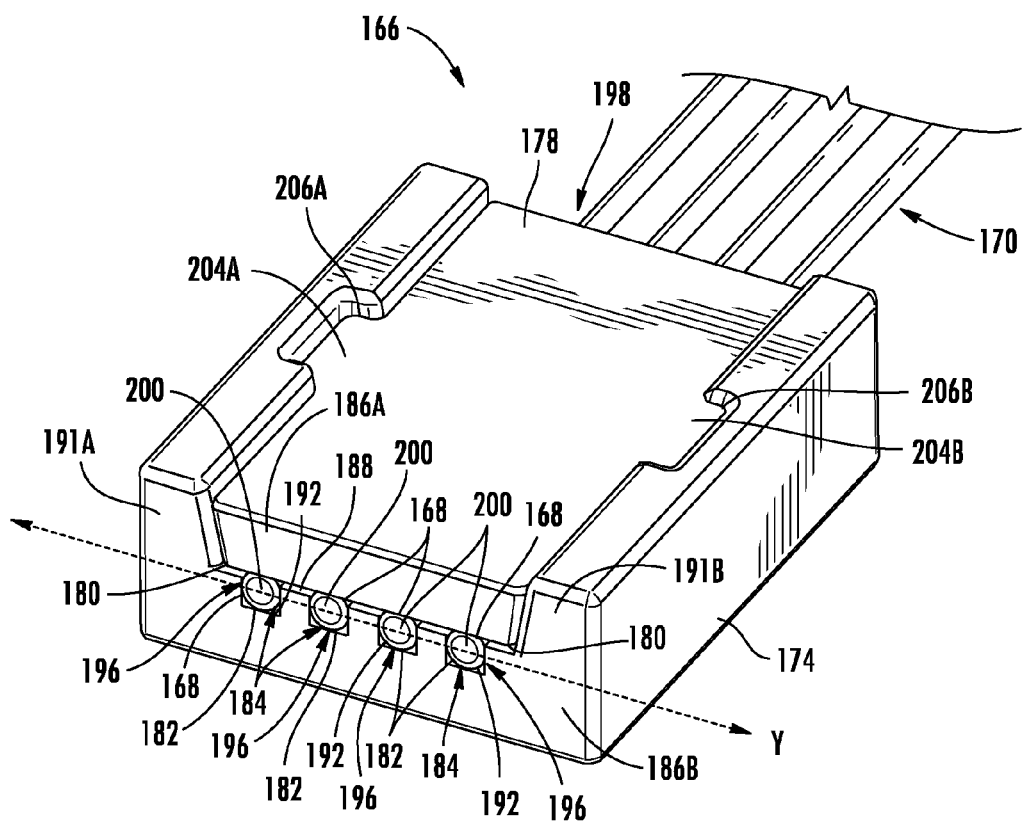
FIG. 9C is a close-up perspective assembled view of the recessed cover GRIN lens holder in FIGS. 9A and 9B.

FIG. 9A is a close-up perspective exploded view of the recessed cover GRIN lens holder 166 disposed in the plug 162 in FIG. 8. FIG. 9B is a close-up perspective exploded view of the recessed cover GRIN lens holder 166 in FIG. 9A with optical fibers and GRIN lenses installed. FIG. 9C is a close-up perspective assembled view of the recessed cover GRIN lens holder 166 in FIGS. 9A and 9B. The GRIN lens holder 166 in this embodiment employs a lens holder body 174 that is configured with an open recess 176 to receive a recessed cover 178 at or below the lens holder body 174 to seal off an internal chamber 180 disposed therein. The GRIN lenses 168 are disposed in the internal chamber 180 in groove alignment features 182 to align the GRIN lenses 168 with the lens holder body 174 and lens openings 184 (formed by the disposing of the recessed cover 178 in the open recess 176 of the lens holder body 174. Alternatively, the groove alignment features 182 could be disposed in the recessed covers 178 instead of the lens holder body 174.

With continuing reference to FIGS. 9A-9C, by providing the open recess 176 in the lens holder body 174, the GRIN lenses 168 can be disposed in the lens holder body 174 through the internal chamber 180 when the recessed cover 178 is removed. An epoxy, gel, or adhesive that has an index of refraction for index matching can then be disposed in the internal chamber 180, and the recessed cover 178 disposed in the open recess 176 to seal off the internal chamber 180 and secure the GRIN lenses 168 inside the lens holder body 174. By providing a separate lens holder body 174 and recessed cover 178, a two piece mating faces 186A, 186B are provided that form a seam 188 along the interface of the lens holder body 174 and the recessed cover 178, as illustrated in FIG. 9C. The seam 188 in the GRIN lens holder 166 provides additional entry locations for debris to enter into the internal chamber 180 if not fully sealed. Further, as discussed below, the lens holder body 174 in this embodiment is also designed with raised sides 191A, 191B that define the internal chamber 180 for receiving the recessed cover 178. The raised sides 191A, 191B can provide increased stability of the lens holder body 174 in the Y-axis direction.

As illustrated in FIGS. 9A-9C, the mating faces 186A, 186B of the GRIN lens holder 166 is configured to abut with a mating face of another GRIN lens holder to optically connect the supported GRIN lenses 168. It is important that the GRIN lenses 168 be properly aligned in the GRIN lens holder 166 and the mating faces 186A, 186B to avoid or reduce coupling losses when the mating faces 186A, 186B are abutted to another mating face to optically connect the supported GRIN lenses 168. In this regard, as illustrated in FIGS. 9A-9C, the GRIN lens holder 166 contains groove alignment features 182. The groove alignment features 182 are configured to support the GRIN lenses 168 disposed in the GRIN lens holder 166, and to align the GRIN lenses 168 with the mating faces 186A, 186B. Also, in this embodiment, the groove alignment features 182 can be provided as part of an integrated structure of the GRIN lens holder 166. For example, the groove alignment features 182 can be provided as part of a mold used to mold manufacture the GRIN lens holder 166. Mold manufacturing the GRIN lens holder 166 can reduce manufacturing steps, manufacturing cost, and provide accurate alignment of the supported GRIN lenses 168.

More detail regarding the GRIN lens holder 166 in FIGS. 9A-9C will now be discussed. With reference to FIG. 9A, the GRIN lenses 168 disposed in the lens holder body 174 of the GRIN lens holder 166 can be fused or optically connected to end portions 190 of bare optical fiber portions 170A of coated optical fiber portions 170B of the optical fibers 170 disposed in the internal chamber 180. The end portions 190 of the optical fibers 170 are disposed in square-shaped grooves 182 disposed in a recessed floor 194 of the internal chamber 180 of the lens holder body 174. The recessed floor 194 is disposed between the raised sides 190A, 190B. The square-shaped grooves 192 support and align the optical fibers 170 and the GRIN lenses 168 in the lens holder body 174. The square-shaped grooves 192 extend in the recessed floor 194 in lens holder body 174 to form the lens openings 196 to the light port openings 198 (shown in FIG. 9B). The square-shaped grooves 192 in this embodiment are also comprised of three different groove sections 192A, 192B, 192C (FIG. 9B) that each have different groove sizes to accommodate and securely support the different outer diameter sized coated optical fibers 170B, the bare optical fibers 170A, and GRIN lenses 168, respectively.

With continuing reference to FIGS. 9A-9C, to provide for locating the GRIN lenses 168 in close proximity to other optical components, the mating faces 186A, 186B is disposed in the lens holder body 174. The mating faces 186A, 186B provide a planar or substantially planar mating surface for abutment to another optical component to bring end faces 200 of the GRIN lenses 168 in contact or close contact to the other optical components for light transfer. In this example, the end faces 200 of the GRIN lenses 168, being planar or substantially planar (e.g., within 25-50 μm) to the mating faces 186A, 186B, can be optically connected to end faces of other GRIN lenses 96 in another mated GRIN lens holder 92 in FIG. 5B.

With continuing reference to FIGS. 9A-9C, to install the GRIN lenses 168 in the GRIN lens holder 166, the GRIN lenses 168 may be disposed in the square-shaped grooves 192 in the internal chamber 180. The end faces 200 of the GRIN lenses 168 are planar or substantially planar (e.g., within 25-50 μm) with the mating faces 186A, 186B. An epoxy, gel, or adhesive that has an index of refraction for index matching may be disposed in the open recess 176 to secure the GRIN lenses 168 in the square-shaped grooves 192 of the lens holder body 174 and to seal off access to the GRIN lenses 168 in the internal chamber 180 of the lens holder body 174. As discussed above, the optical fibers 170 may be disposed in the square-shaped grooves 192 in the lens holder body 174. End portions 190 of the bare optical fiber portions 170A, provided by removing coating from coated optical fiber portions 170B, may be inserted in the square-shaped grooves 192. The bare optical fiber portions 170A may be brought into contact, fused, or in close contact with the ends 202 of the GRIN lenses 168, to optically connect the optical fibers 170 with the GRIN lenses 168.

After the GRIN lenses 168 and optical fibers 170 are installed in the square-shaped grooves 192 in the lens holder body 174 in FIG. 9B and epoxy, gel, or adhesive is inserted in the internal chamber 180, the recessed cover 178 is ready to be installed. As illustrated in FIG. 9C, the recessed cover 178 contains two mating features 204A, 204B that are configured to interface with two mating recesses 206A, 206B disposed in the lens holder body 174. The recessed cover 178 is inserted into the open recess 176 with the mating features 204A, 204B disposed in the recesses 206A, 206B. The mating of the recessed cover 178 with the open recess 176 forms the lens openings 196 and the light port openings 198 in the GRIN lens holder 166.

Figure 10:
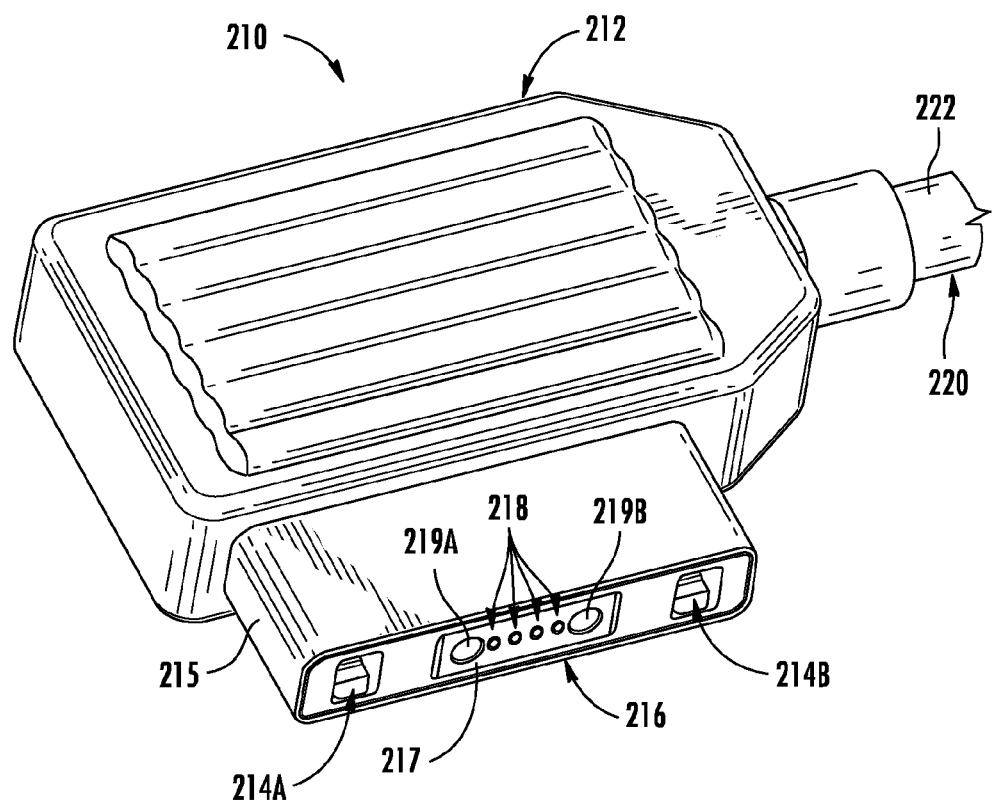
FIG. 10 is a perspective view of another exemplary cable plug employing a gradient index (GRIN) lens holder comprised of a split component lens holder employing internal groove alignment features for securing and aligning GRIN lenses.

FIG. 10 is a perspective view of another exemplary connector 210 employing a GRIN lens holder configured to support and align GRIN lenses. The connector 210 in this embodiment is provided in the form of a plug 212. For example, the plug 212 may be a fiber optic connection plug that exclusively supports optical components for establishing optical connections. Alternatively, the plug 212 may also include electrical components, such as power conductors 214A, 214B disposed in the plug 212, for establishing electrical connections.

With continuing reference to FIG. 10, the plug 212 in this embodiment employs a gradient index (GRIN) lens holder 216 to support optical components for establishing optical connections, similar to the plug 12 in FIG. 1. As will be discussed in more detail below, the GRIN lens holder 216 is comprised of split component bodies instead of a one piece component in this embodiment. The GRIN lens holder 216 is disposed in a connector housing 215 of the plug 212. The GRIN lens holder 216 could be disposed in a ferrule 217 that is disposed in the connector housing 215. The GRIN lens holder 216 is configured to support and align one or more GRIN lenses 218 disposed in the GRIN lens holder 216. For example, the GRIN lens holder 216 disposed in the plug 212 in FIG. 10 is configured to support up to four (4) GRIN lenses 218. The GRIN lenses 218 are optically coupled or fused to optical fibers 220 disposed in a cable 222 secured to the plug 212. In this manner, an optical connection made to the GRIN lenses 218 disposed in the GRIN lens holder 216 through a mating of the plug 212 to a receptacle or other optical component establishes an optical connection to the optical fibers 220. Alignment openings 219A, 219B are disposed in the plug 212 to assist in alignment of the plug 212 to a receptacle when the plug 212 is mated to a receptacle.

FIGS. 11A and 11B are close-up perspective assembled and exploded views, respectively, of the split component, GRIN lens holder 216 of the plug 212 in FIG. 10. As illustrated in FIG. 11B, the GRIN lens holder 216 is comprised of a lens holder body 224 that is comprised of two split component bodies 226A, 226B. The two split component bodies 226A, 226B are complementary to each other such that when the split component body 226A is disposed on split component body 226B, the assembly creates the lens holder body 224. The alignment openings 219A, 219B, light port openings 227, and lens openings 228 are formed when the two split component bodies 226A, 226B are fitted together, as illustrated in FIGS. 11A and 11B. An internal chamber 232 is also formed inside the two split components bodies 226A, 226B when fitted to each other. By providing two split component bodies 226A, 226B, manufacture of the lens holder body 224 and the two split components bodies 226A, 226B may be easier or more cost effective, and may be easier to provide as molded or stamped components, if desired. The GRIN lenses 218 and optical fibers 220 may be easily disposed in the lens holder body 224, because the GRIN lenses 218 and optical fibers 220 can be disposed in the split component body 226B without having to be inserted through the lens openings 228 and light port openings 227.

As illustrated in FIG. 11A, a mating face 234 of the GRIN lens holder 216 is formed when the two split components bodies 226A, 226B are fitted to each other. The mating face 234 is configured to abut with a mating face of another optical component to optically connect supported GRIN lenses 218. The mating face 234 is formed from planar or substantially planar mating surfaces 242A, 242B disposed in the split component bodies 226A, 226B coming together. The mating face 234 is provided for abutment to another optical component to bring end faces 230 of the GRIN lenses 218 in contact or close contact to the other optical components for light transfer.

Figure 12A:
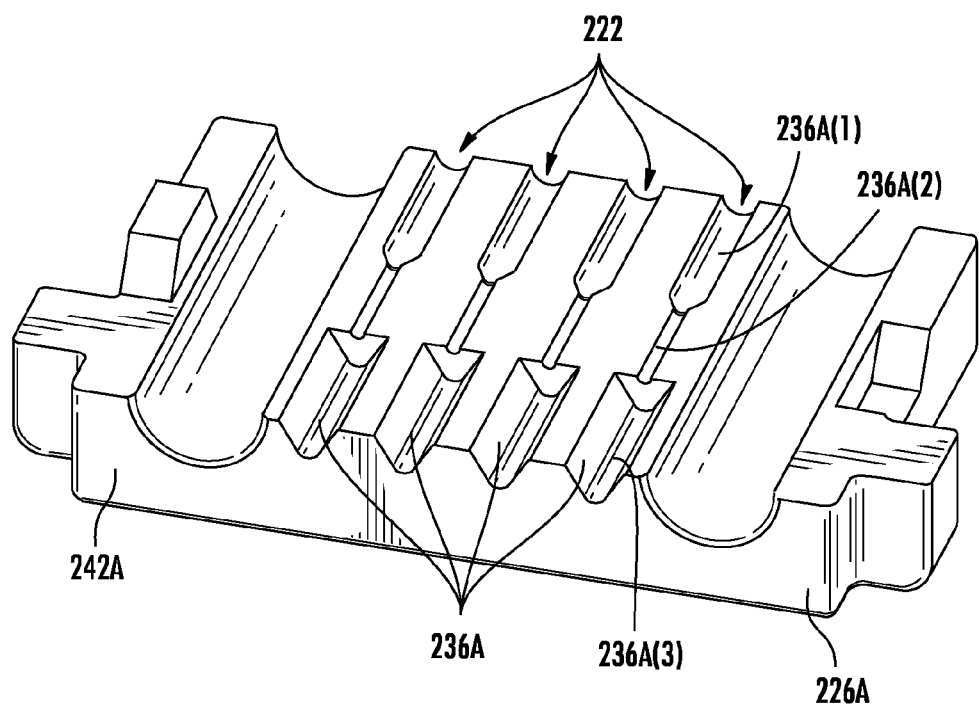
FIG. 12A is a close-up perspective view of a first split component body of the split component GRIN lens holder in FIG. 10.
Figure 12B:
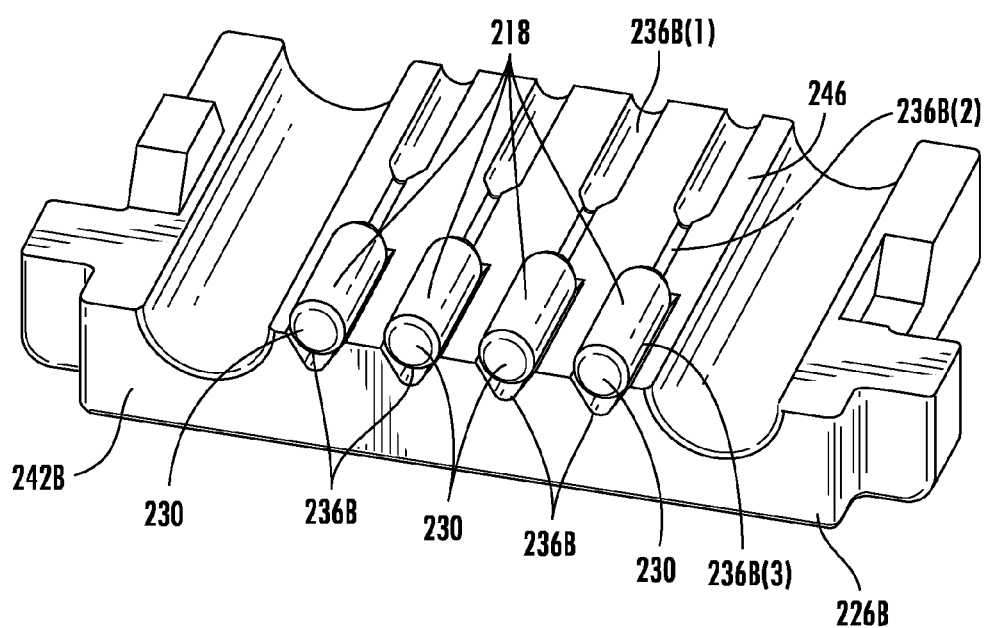
FIG. 12B is a close-up perspective view of a second split component body complementary to the split component body in FIG. 12A, and is supporting GRIN lenses in the groove alignment features.

It is important that the GRIN lenses 218 be properly aligned with the GRIN lens holders 216 at the mating face 234 to avoid or reduce coupling losses when the mating face 234 is abutted to another optical component. In this regard, as illustrated in FIGS. 12A and 12B and discussed in more detail below, the split component bodies 226A, 226B contain groove alignment features 236A, 236B, respectively. When the split component bodies 226A, 226B are fitted together, the groove alignment features 236A, 236B come together to form the light port openings 227 and the lens openings 228 in the lens holder body 224. The groove alignment features 236A, 236B are configured to support the GRIN lenses 218 and to align the GRIN lenses 218 with the mating face 234 when the split component body 226B is fitted with split component body 226A. By providing the groove alignment features 236A, 236B, the alignment of the GRIN lenses 218 may be more accurate than alternative methods, such as using pins to dispose alignment through-holes or bores in a lens holder body during manufacture. Using pins to dispose through-holes or bores in lens holder bodies after their manufacture can introduce alignment inaccuracies. To mold bores in a lens holder body would require small mold components that need to slide within each other. This in turn creates heat removal issues as well as negatively impacting overall part and alignment accuracy.

Note that with regard to FIG. 12A, the groove alignment features 236A disposed in the split component body 226A in this embodiment are also comprised of three different groove sections 236A(1), 236A(2), 236A(3). Each groove section 236A(1), 236A(2), 236A(3) has different groove sizes to accommodate and securely support the different outer diameter sized coated optical fibers 20B and bare optical fibers 20A (not shown) and the GRIN lenses 218, respectively. Similarly in regard to FIG. 12B, the groove alignment features 236B disposed in the split component body 226B in this embodiment are also comprised of three different groove sections 236B(1), 236B(2), 236B(3). Each of each groove sections 236B(1), 236B(2), 236B(3) has different groove sizes to accommodate and securely support the different outer diameter sized coated optical fibers 240B and bare optical fibers 240A (not shown) and the GRIN lenses 218, respectively.

Also, in this embodiment, the groove alignment features 236A, 236B are provided as part of an integrated structure of the split component bodies 226A, 226B. For example, the groove alignment features 236A, 236B can be provided as part of a mold used to mold manufacture the lens holder body 224. Mold manufacturing the lens holder body 224 can reduce manufacturing steps, manufacturing cost, and provide accurate alignment of the supported GRIN lenses 218.

Note that the split component bodies 226A, 226B may be constructed from a polymer or any other material that is suitable for supporting the GRIN lenses 218 and the optical fibers 220 disposed in the lens holder body 224 formed from the split component bodies 226A, 226B. As non-limiting examples, the split component bodies 226A, 226B may be produced from a mold in a molding process.

As illustrated in FIG. 11B, the GRIN lenses 218 can be fused or optically connected to end portions 238 of bare optical fiber portions 240A of coated optical fiber portions 240B of the optical fibers 220 disposed in the groove alignment features 236B (FIG. 12B). For example, the bare optical fiber portions 240A may be one hundred twenty-five (125) µm in diameter, and the coated optical fiber portions 240B may be two hundred fifty (250) µm in diameter, as non-limiting examples.

To install the GRIN lenses 218 in the lens holder body 224, the GRIN lenses 218 are disposed in the groove alignment features 236B, as illustrated in FIG. 12B. The GRIN lenses 218 are disposed in the groove alignment features 236B such that the end faces 230 of the GRIN lenses 218 are planar or substantially planar (e.g., within 25-50 µm) with the mating surface 242B. An epoxy, gel, or adhesive that has an index of refraction for index matching may be disposed on a recessed floor 246 of the split component body 226B before the split component body 226A in FIG. 12A is fitted to the split component body 226B, to secure the GRIN lenses 218 in the groove alignment features 236A, 236B and to seal off access to the GRIN lenses 218.

Figure 13B:
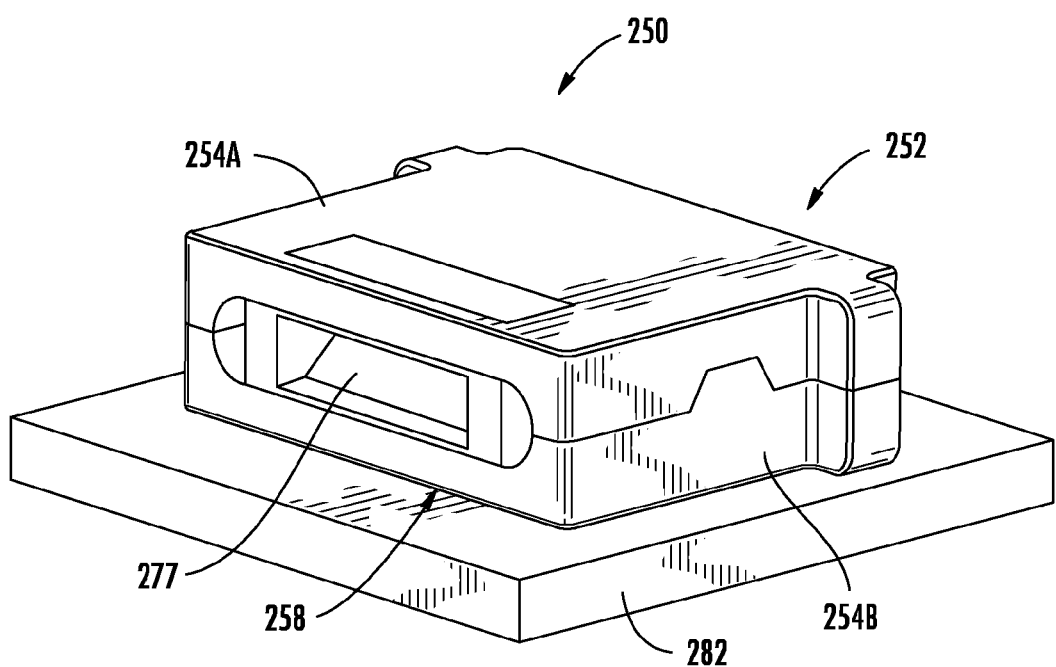
FIG. 13B is a close-up rear perspective assembled view of the recessed cover GRIN lens holder in FIG. 13A.
Figure 13C:
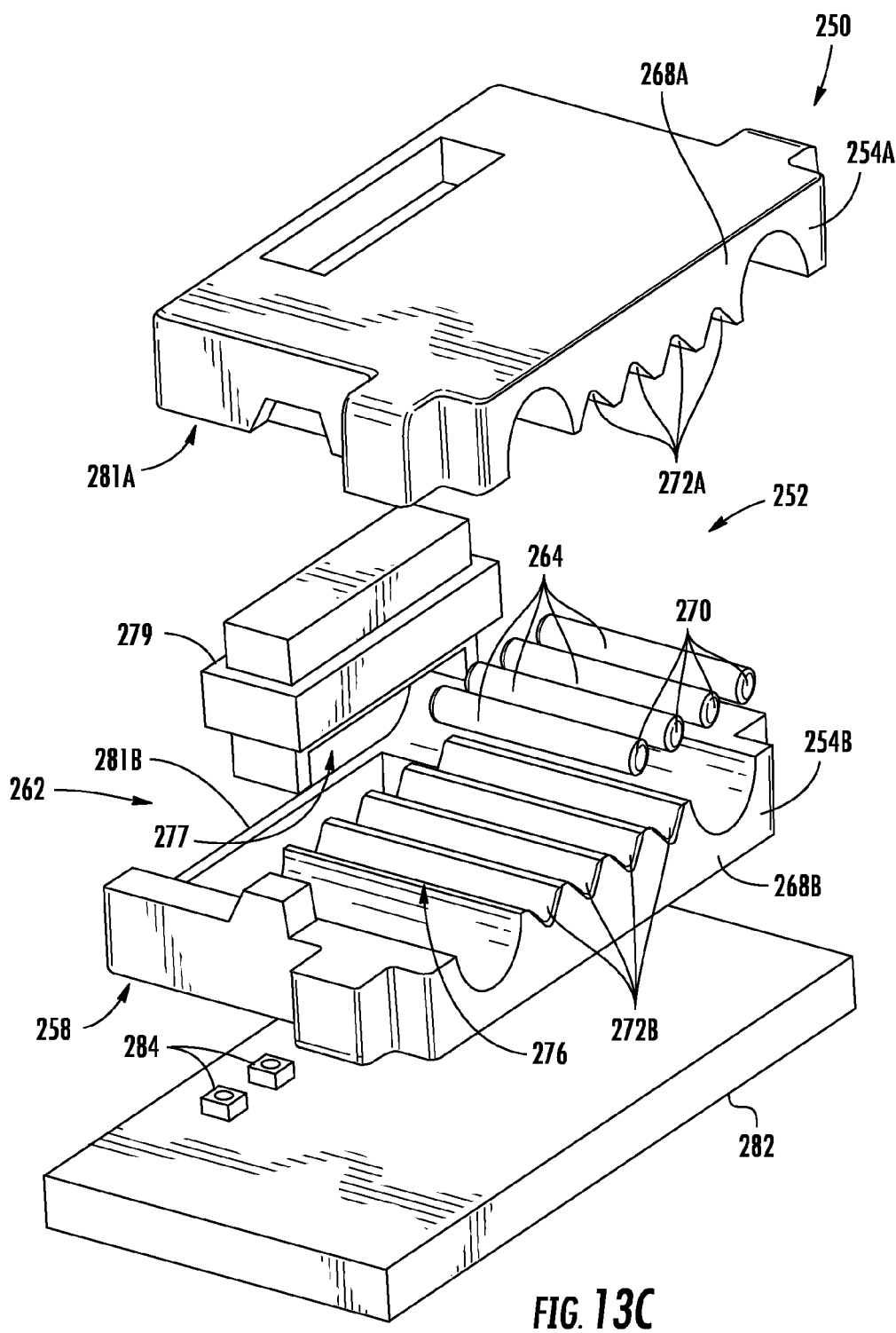
FIG. 13C is a close-up top perspective exploded view of the recessed cover GRIN lens holder in FIG. 13A.
Figure 13D:
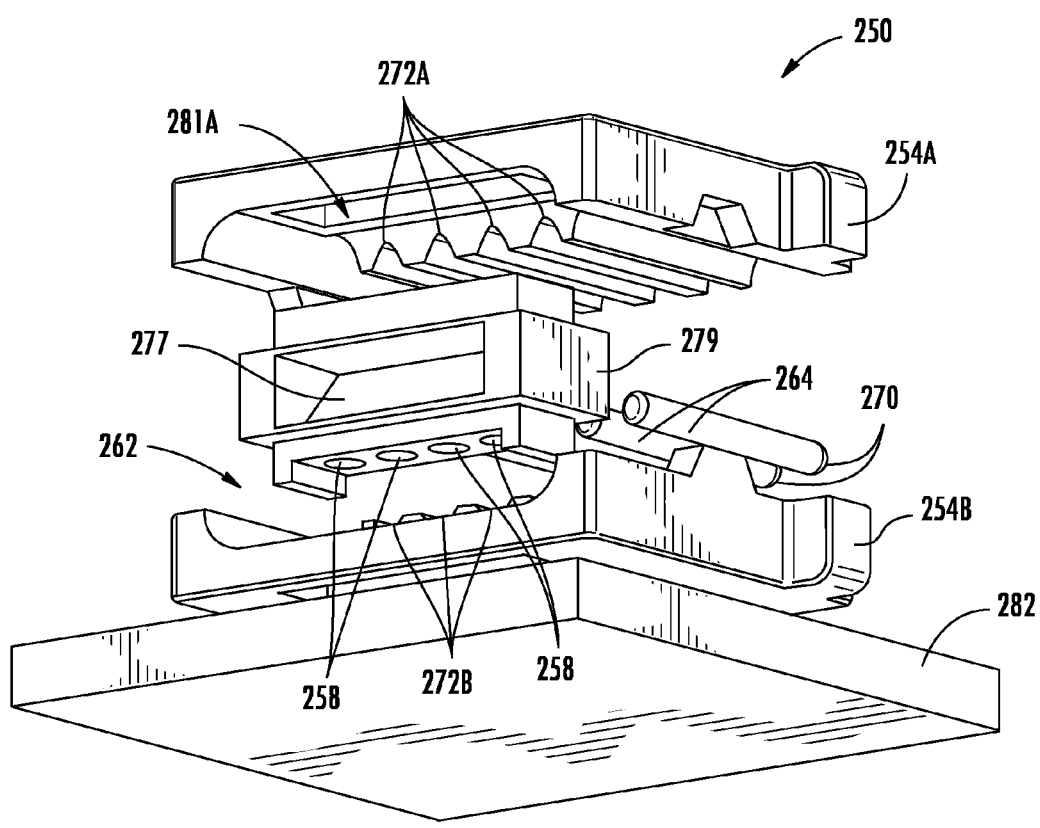
FIG. 13D is a close-up bottom perspective exploded view of the recessed cover GRIN lens holder in FIG. 13A.
Figure 13E:
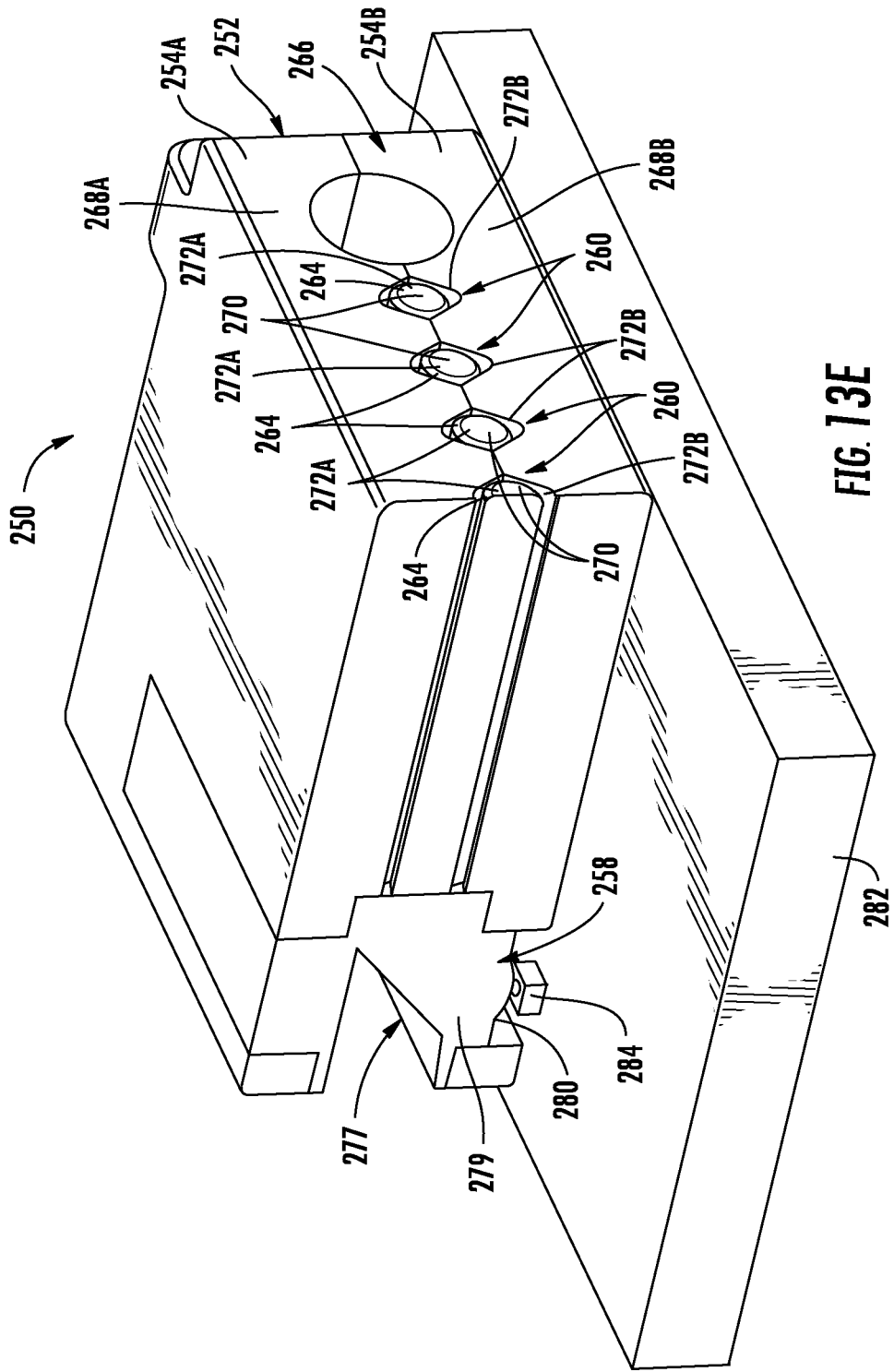
FIG. 13E is a close-up perspective cross-sectional view of the recessed cover GRIN lens holder in FIG. 13A.

FIGS. 13A-13E are view of a receptacle GRIN lens holder 250 that contains split component bodies that may be employed as a receptacle employing internal groove alignment features for securing and aligning GRIN lenses. The GRIN lens holder 250 is configured to mate with the GRIN lens holder 216 in FIGS. 11A and 11B. FIGS. 13A and 13B are a close-up front and rear perspective, assembled views, respectively of the split component GRIN lens holder 250. FIGS. 13C and 13D are close-up top and bottom perspective exploded views, respectively, of the split component GRIN lens holder 250. FIG. 13E is a close-up perspective cross-sectional view of the split component GRIN lens holder 250.

With reference to FIGS. 13A and 13B, the GRIN lens holder 250 is comprised of a lens holder body 252 that is comprised of two split component bodies 254A, 254B. The two split component bodies 254A, 254B are complementary to each other such that when the split component body 254A is disposed on split component body 254B, the assembly creates the lens holder body 252. Alignment openings 256A, 256B, lenses 258, and lens openings 260 (FIGS. 13A and 13E) are formed when the two split component bodies 254A, 254B are fitted together, as illustrated in FIGS. 13A and 13E. An internal chamber 262 (FIG. 13C) is also formed inside the two split components bodies 254A, 254B when fitted to each other. By providing two split component bodies 254A, 254B, manufacture of the lens holder body 252 and the two split component bodies 254A, 254B may be easier or more cost effective, and may be easier to provide as molded or stamped components, if desired. GRIN lenses 264 may be easily disposed in the lens holder body 252, because the GRIN lenses 264 can be disposed in the split component body 254B without having to be inserted through the lens openings 260.

As illustrated in FIG. 13A, a mating face 266 of the GRIN lens holder 250 is formed when the two split components 254A, 254B are fitted to each other. The mating face 266 is configured to abut with a mating face of another optical component to optically connect supported GRIN lenses 264. The mating face 266 is formed from planar or substantially planar mating surfaces 268A, 268B disposed in the split component bodies 254A, 254B coming together. The mating face 266 is provided for abutment to another optical component to bring end faces 270 of the GRIN lenses 264 in contact or close contact to the other optical components for light transfer.

It is important that the GRIN lenses 264 be properly aligned with the lens holder body 252 at the mating face 266 to avoid or reduce coupling losses when the mating face 266 is abutted to another optical component. In this regard, as illustrated in FIG. 13C, the split component bodies 254A, 254B contain groove alignment features 272A, 272B, respectively. When the split component bodies 254A, 254B are fitted together, the groove alignment features 272A, 272B come together to form the lens openings 260 in the lens holder body 252. The groove alignment features 272A, 272B are configured to support the GRIN lenses 264 and to align the GRIN lenses 264 with the mating face 266 when the split component body 254B is fitted with split component body 254A. By providing the groove alignment features 272A, 272B, the alignment of the GRIN lenses 264 may be more accurate than alternative methods, such as using pins to dispose alignment through-holes or bores in a lens holder body during manufacture. Using pins to dispose through-holes or bores in lens holder bodies after their manufacture can introduce alignment inaccuracies. To mold bores in a lens holder body would require small mold components that need to slide within each other. This in turn creates heat removal issues as well as negatively impacting overall part and alignment accuracy.

Also, in this embodiment, the groove alignment features 272A, 272B are provided as part of an integrated structure of the split component bodies 254A, 254B. For example, the groove alignment features 272A, 272B can be provided as part of a mold used to mold manufacture the lens holder body 252. Mold manufacturing the lens holder body 252 can reduce manufacturing steps, manufacturing cost, and provide accurate alignment of the supported GRIN lenses 264.

With reference to FIGS. 13C-13E, the GRIN lenses 264 can be arranged to transfer light, directly or indirectly, through the lenses 258 disposed in a surface 280 extending through the split component body 254B. The split component body 254B may be made from a light transmissive material at the desired wavelengths so that the lenses 258 disposed in the surface 280 can receive light from a light source. In this embodiment, the GRIN lens holder 250 is mounted to a printed circuit board (PCB) 282 that contains optical devices 284 (see FIGS. 13C-13E). The optical devices 284 are aligned with the lenses 258 for either directing light to or receiving light from lenses 258 and the GRIN lenses 264, which are aligned with the lenses 258 in the split component body 254B.

As shown in FIG. 13B, a TIR surface 277 is provided in the lens holder body 252. The TIR surface 277 reflects light to and from the GRIN lenses 264 disposed therein. The TIR surface 277 may be disposed in a separate TIR body 279 that is disposed between split component bodies 254A, 254B, as illustrated in FIGS. 13C-13E. For example, the split component bodies 254A, 254B each have chambers 281A, 281B, as illustrated in FIGS. 13C and 13D, to secure the TIR body 279 inside the GRIN lens holder 250 formed by the split component bodies 254A, 254B mated together. The TIR body 279 may be constructed from a light transmissive material. The TIR surface 277 may be disposed at angle relative to an emission path between the optical devices 284. Light received through lenses 258 disposed in the TIR body 279 from a transmitter optical device 284 disposed on the PCB 282 is emitted in a first emission path, which may be orthogonal to the optical axes of the GRIN lenses 264. This light is reflected off of the TIR surface 277 into a second emission path aligned to the optical axes of the GRIN lenses 264. Similarly, light received from the GRIN lenses 264 in the second emission path is reflected off of the TIR surface 277 into the first emission path to be transmitted to the lenses 258 and received by a receiver optical device 284.

Note that the split component bodies 254A, 254B may be constructed from a polymer or any other material that is suitable for supporting the GRIN lenses 264. As non-limiting examples, the split component bodies 254A, 254B may be produced from a mold in a molding process. The split component bodies 254A, 254B may be constructed from plastic or metal.

With reference to FIG. 13C, to install the GRIN lenses 264 in the split component body 254B, the GRIN lenses 264 are disposed in the groove alignment features 272B, as illustrated in FIG. 13E. The GRIN lenses 264 are disposed in the groove alignment features 272B such that the end faces 270 of the GRIN lenses 264 are planar or substantially planar (e.g., within 25-50 μm) with the mating surface 268B. An epoxy, gel, or adhesive that has an index of refraction for index matching may be disposed on a recessed floor 276 of the split component body 254B, as illustrated in FIG. 13C, before the split component body 254A is fitted to the split component body 254B, to secure the GRIN lenses 264 in the groove alignment features 272A, 272B and to seal off access to the GRIN lenses 264.

As non-limiting examples, the GRIN lenses disclosed herein may comprise a generally cylindrical glass member having a radially varying index of refraction, the glass member having a length such that the lens has a pitch of less than about 0.23. As used herein, the pitch length of the lens, Lo, is $2\pi/A$; the fractional pitch, or, hereafter, pitch, is $L/Lo=LA/2\pi$, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about one (1) mm, for example, 0.8 mm. In certain embodiments, lenses having a diameter less than about 1 mm are operative to produce a beam having a mode field diameter between about 350 µm and 450 µm when illuminated with a beam having a mode field diameter of about 10.4 µm.

Examples of optical devices that can interface with the GRIN lenses disclosed in the GRIN lens holders disclosed herein include, but are not limited to, fiber optic collimators, DWDMs, OADMs, isolators, circulators, hybrid optical devices, optical attenuators, MEMs devices, and optical switches.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A gradient index (GRIN) lens holder, comprising:
a lens holder body comprising an internal chamber, a recessed floor disposed in the internal chamber, a first raised side disposed on a first side of the recessed floor, and a second raised side disposed on a second side of the recessed floor;
a mating face disposed in the lens holder body;
at least one lens opening disposed in the mating face and coupled in free space to the internal chamber, the at least one lens opening configured to receive at least one end portion of at least one GRIN lens;
at least one groove alignment feature disposed in the recessed floor of the internal chamber of the lens holder body and optically aligned with the at least one lens opening, the at least one groove alignment feature configured to support at least one GRIN lens disposed in the internal chamber and align at least one end portion of the at least one GRIN lens with the at least one lens opening; and
a recessed cover disposed in the internal chamber between the first raised side and the second raised side of the lens holder body, and further comprising at least one mating feature disposed in the lens holder body configured to receive at least one mating feature of the recessed cover disposed in the internal chamber.

2. The GRIN lens holder of claim 1, wherein the at least one groove alignment feature is disposed in a floor disposed in the internal chamber, wherein the at least one groove alignment feature is configured to support the at least one GRIN lens with a gap between the at least one GRIN lens and the floor.

3. The GRIN lens holder of claim 1, wherein the at least one groove alignment feature is comprised of at least one first groove disposed on a first end portion of the internal chamber and at least one second groove disposed on a second end portion of the internal chamber adjacent to the at least one lens opening.

4. The GRIN lens holder of claim 1, wherein the at least one groove alignment feature is comprised of at least one V-shaped groove.

5. The GRIN lens holder of claim 1, wherein the at least one groove alignment feature does not extend into the at least one lens opening.

6. The GRIN lens holder of claim 1, wherein the at least one groove alignment feature extends into the at least one lens opening.

7. The GRIN lens holder of claim 1, wherein the at least one groove alignment feature is comprised of a plurality of different sized groove sections.

8. The GRIN lens holder of claim 1, further comprising at least one light port opening disposed in the lens holder body and coupled in free space to the internal chamber, the at least one light port opening is configured to receive at least one end portion of at least one optical fiber.

9. The GRIN lens holder of claim 8, wherein the at least one light port opening is configured to be optically aligned with at least one light emitter or light port of an optical device.

10. The GRIN lens holder of claim 1, further comprising a TIR surface disposed in the lens holder body in a first optical axis of the at least one lens opening, the TIR surface configured to TIR reflect light in the first optical axis.

11. The GRIN lens holder of claim 10, further comprising at least one lens disposed in the lens holder body in a second optical axis, the at least one lens configured to transmit light in the second optical axis to the TIR surface.

12. The GRIN lens holder of claim 11, wherein the at least one lens is formed by a light transmissive material disposed in the lens holder body.

13. A method of providing a gradient index (GRIN) lens for a fiber optic connector, comprising:
> providing a lens holder body comprising an internal chamber, a recessed floor disposed in the internal chamber, a first raised side disposed on a first side of the recessed floor, and a second raised side disposed on a second side of the recessed floor;
> disposing at least one GRIN lens in at least one groove alignment feature disposed in the internal chamber of the lens holder body, the at least one groove alignment feature optically aligned with at least one lens opening disposed in a mating face of the lens holder body to optically align the at least one GRIN lens with the at least one lens opening, the at least one lens opening coupled in free space to the internal chamber;
> disposing a first end portion of the at least one GRIN lens through the at least one lens opening and planar to the mating face of the lens holder body; and
> disposing a recessed cover in the internal chamber between the first raised side and the second raised side such that at least one mating feature disposed in the lens holder body receives at least one mating feature of the recessed cover disposed in the internal chamber.

14. The method of claim 13, comprising disposing the at least one GRIN lens in the at least one groove alignment feature disposed in a floor disposed in the internal chamber of the lens holder body to provide a gap between the floor and the at least one GRIN lens.

15. The method of claim 13, wherein providing the lens holder body comprises molding or stamping the lens holder body such that the at least one groove alignment feature is formed from a cavity formed in the lens holder body by a mold or stamp.

16. The method of claim 13, further comprising:
> disposing at least one optical fiber through at least one light port opening disposed in the lens holder body and coupled in free space to the internal chamber; and
> optically connecting an end portion of the at least one optical fiber disposed in the internal chamber to a second end portion of the at least one GRIN lens to optically connect the at least one optical fiber to the at least one GRIN lens.

17. The method of claim 13, further comprising a TIR surface disposed in the lens holder body in a first optical axis of the at least one lens opening, the TIR surface TIR reflecting light in the first optical axis.

18. The method of claim 17, further comprising at least one lens disposed in the lens holder body in a second optical axis, the at least one lens transmitting light in the second optical axis to the TIR surface.

* * * * *